US010192272B2

(12) United States Patent
Morse et al.

(10) Patent No.: US 10,192,272 B2
(45) Date of Patent: Jan. 29, 2019

(54) EXPENSE REPORT MANAGEMENT METHODS AND APPARATUS

(71) Applicant: SourceCode Technology Holdings, Inc., Bellevue, WA (US)

(72) Inventors: Michael Fuentes Morse, Snoqualmie, WA (US); Rénier Britz, Snoqualmie, WA (US); Olaf Alexander Wagner, Issaquah, WA (US); David Jonathan Marcus, Bellevue, WA (US); Johan Willem van Heerden, Snoqualmie, WA (US); Adriaan van Wyk, Snoqualmie, WA (US); Anthony Thomas Petro, Denver, CO (US)

(73) Assignee: SOURCECODE TECHNOLOGY HOLDINGS, INC., Bellevue, WA (US)

( * ) Notice: Subject to any disclaimer, the term of this patent is extended or adjusted under 35 U.S.C. 154(b) by 331 days.

(21) Appl. No.: 14/994,417

(22) Filed: Jan. 13, 2016

(65) Prior Publication Data

US 2017/0200234 A1 Jul. 13, 2017

(51) Int. Cl.
*G07B 17/00* (2006.01)
*G06Q 40/00* (2012.01)
(Continued)

(52) U.S. Cl.
CPC .......... *G06Q 40/12* (2013.12); *G06F 3/0482* (2013.01); *G06F 3/04842* (2013.01); *G06F 17/2247* (2013.01); *G06Q 10/10* (2013.01)

(58) Field of Classification Search
CPC .............................. G06Q 40/12; G06F 3/0482
(Continued)

(56) References Cited

U.S. PATENT DOCUMENTS

2001/0042032 A1 11/2001 Crawshaw et al.
2004/0193457 A1* 9/2004 Shogren ................ G06Q 10/02
705/5

(Continued)

FOREIGN PATENT DOCUMENTS

EP 1577817 9/2005

OTHER PUBLICATIONS

Wikipedia: "Transport Layer Security—Wikipedia, the free encyclopedia", Sep. 7, 2012, retrieved from: URL:https://en.wikipedia.org/w/index.php? [May 24, 2016].

(Continued)

*Primary Examiner* — Rokib Masud
(74) *Attorney, Agent, or Firm* — K&L Gates LLP

(57) ABSTRACT

A system, method, and apparatus for managing expense reports are disclosed. An example apparatus includes an aggregation interface configured to receive, from a financial entity, a defined account data subset of account data related to a financial transaction of a user and a defined transaction data subset of transaction data of the financial transaction. The example apparatus also includes a secure transaction engine configured to create an expense object that includes the defined account data subset and the defined transaction data subset and display information from the expense object within a first graphical user interface in conjunction with information from other expense objects related to the user. The secure transaction engine is also configured to create an expense report that includes an expense object selected by the user and selectively excludes the other expense objects to shield the other expense objects from being accessible or viewed by a third-party.

23 Claims, 12 Drawing Sheets

(51) Int. Cl.
*G06F 3/0484* (2013.01)
*G06F 3/0482* (2013.01)
*G06F 17/22* (2006.01)
*G06Q 10/10* (2012.01)

(58) Field of Classification Search
USPC .................................................. 705/26, 30
See application file for complete search history.

(56) References Cited

U.S. PATENT DOCUMENTS

| | | | | |
|---|---|---|---|---|
| 2005/0073951 | A1* | 4/2005 | Robotham | H04L 49/254 370/229 |
| 2005/0222944 | A1 | 10/2005 | Dodson et al. | |
| 2008/0104133 | A1 | 5/2008 | Chellappa et al. | |
| 2014/0358743 | A1* | 12/2014 | Marseille | G06Q 40/12 705/30 |
| 2015/0222854 | A1* | 8/2015 | Lachapelle | H04N 7/15 348/14.08 |

OTHER PUBLICATIONS

Anonymous: "HTTPS—Wikipedia, the free encyclopedia", Mar. 20, 2014, URL: https://en.wikipedia.org/w/index.php?title=HTTPS &oldid-600447172 [Jun. 20, 2016].

Search Report and Opinion dated Mar. 9, 2017 issued by the European Patent Office for European Patent Application No. 17150620.7.

Examination Report dated Jan. 23, 2018 issued by the European Patent Office for European Patent Application No. 17150620.7.

* cited by examiner

EXPENSE REPORT MANAGEMENT METHODS AND APPARATUS

BACKGROUND

Business expense reimbursement is loathed by business travelers, employees, and anyone else that has to complete a reimbursement form. This is especially true for frequent travelers who may accumulate hundreds to thousands of individual reimbursable items every year for such things as flights, trains, subways, car services, rental cars, parking, hotels, meals, drinks, phone usage, entertainment, etc. Current known systems typically require that each expense item be manually entered into a form, which then gets submitted for approval, and hopefully, results in reimbursement. To complicate matters, companies oftentimes require employees or contractors to submit expenses within a certain time period, such as two weeks or a month from when the expenses were incurred. It has become quite common for an employee (or an administrative assistant) to spend a significant portion of a workday or significant portion of an evening or weekend completing an expense reimbursement form. To make matters worse, as employers attempt to cut costs, many expense reimbursement forms are returned to the submitters for items that do not conform to company policies or are otherwise unclear.

Some known systems attempt to address the above issues by providing an application that uses a camera on a smartphone to record pictures of business receipts. These known systems use optical character recognition technology to read the receipts and fill in the appropriate fields in the reimbursement forms. While these systems work with varying degrees of success, it is required that the user obtain and save a paper (or electronic) copy of a receipt. Frequent travelers oftentimes lose or misplace paper receipts. In other instances, receipts are not even provided. As a result, business travelers and other employees are left to manually enter items into the expense reimbursement form.

Other known systems are linked to a credit card of the traveler. These systems are managed by the employer and usually require that the credit card be issued though the employer as a company business card. Even if the credit card is not issued through the company, these systems are configured to pull, import, or otherwise obtain all of the transactions for that credit card. In other words, through this known expense reimbursement system, the employer has access to all transactions for the linked credit card. This visibility to the employer may not be an issue some of the time. However, some business travelers and other employees/contractors may wish to keep their employers from seeing some transactions that will never be submitted for reimbursement (e.g., a souvenir for a spouse or children, a hotel pay-per-view movie, a client outing to an exotic club, bottle service at a bar, intentional or accidental uses of the credit card for personal reasons, etc.). In some cases, an employer may view the transactions (even the ones that are not submitted) and use the content of the transactions as a basis for firing or otherwise discriminating or disciplining the employee.

These known systems usually require that all of the received transactions are submitted for reimbursement. The systems may even send weekly or monthly reminders until every transaction has been submitted or promote the unsubmitted transactions to a supervisor. As mentioned, some transactions are not within the guidelines for expense reimbursement and will never be submitted, which means they have to linger in the system or be manually removed by someone with administrative privileges. Other transactions may be business related for a client but the employee may not want to submit the transactions for reimbursement to prevent from being tacky and billing the client for the expense.

SUMMARY

The present disclosure provides a new and innovative system, method, and apparatus for expense report management. The example system, method, and apparatus are configured to temporarily pull account data and transaction data from one or more financial entities to which a business expense is charged. The account data and transaction data are displayed to a user during a session in a graphical user interface that provides the appearance that each of the displayed financial transactions is stored at a single location. The example system, method, and apparatus are configured to enable a user to select which of the transactions are to be submitted and create an expense report based on the selected transactions. Only relevant transaction data (e.g., a transaction identifier, a description of the financial transaction, a merchant name, an amount, and a post date) for the selected transactions are used in the expense report to prove the transactions are valid expenses. The account data and other transaction data are not provided in the expense report and are eventually discard or deleted after the expense report is transmitted or the user closes the session. The example system, method, and apparatus disclosed herein accordingly enable business travelers and other employees/contractors to selectively exclude certain transactions from ever being accessible or viewed by an employer or other party.

In an example embodiment, an expense report management apparatus includes an aggregation interface configured to receive, from a financial entity, a defined account data subset of account data related to a financial transaction of a user, the defined account data subset including an account identifier of an account that includes the financial transaction. The aggregation interface also receives, from the financial entity, a defined transaction data subset of transaction data of the financial transaction, the defined transaction data subset including a transaction identifier, a description of the financial transaction, a merchant name, an amount, and a post date. The expense report management apparatus also includes a secure transaction engine communicatively coupled to the aggregation interface and configured to create an expense object that includes the defined account data subset and the defined transaction data subset and display information from the expense object within a first graphical user interface in conjunction with information from other expense objects related to the user, each of the other expense objects including a respective defined account data subset and a respective defined transaction data subset. The secure transaction engine also is configured to receive an expense message from the user indicating that the expense object is to be submitted to a third-party designated to perform expense reimbursement and responsive to receiving the expense message, store the expense object to a file within a memory, create an expense report that includes the expense object and selectively excludes the other expense objects to shield the other expense objects from being accessible or viewed by the third-party, and discard the other expense objects. The example secure transaction engine is further configured to display information from the expense report within a second graphical user interface including information from the expense object that is indicative of information the third-party will view to perform expense reimbursement and responsive to receiving a submit message from the user, transmit the expense report to a server of the third-party for expense reimbursement.

Additional features and advantages of the disclosed system, method, and apparatus are described in, and will be apparent from, the following Detailed Description and the Figures.

DETAILED DESCRIPTION

Figure 1:
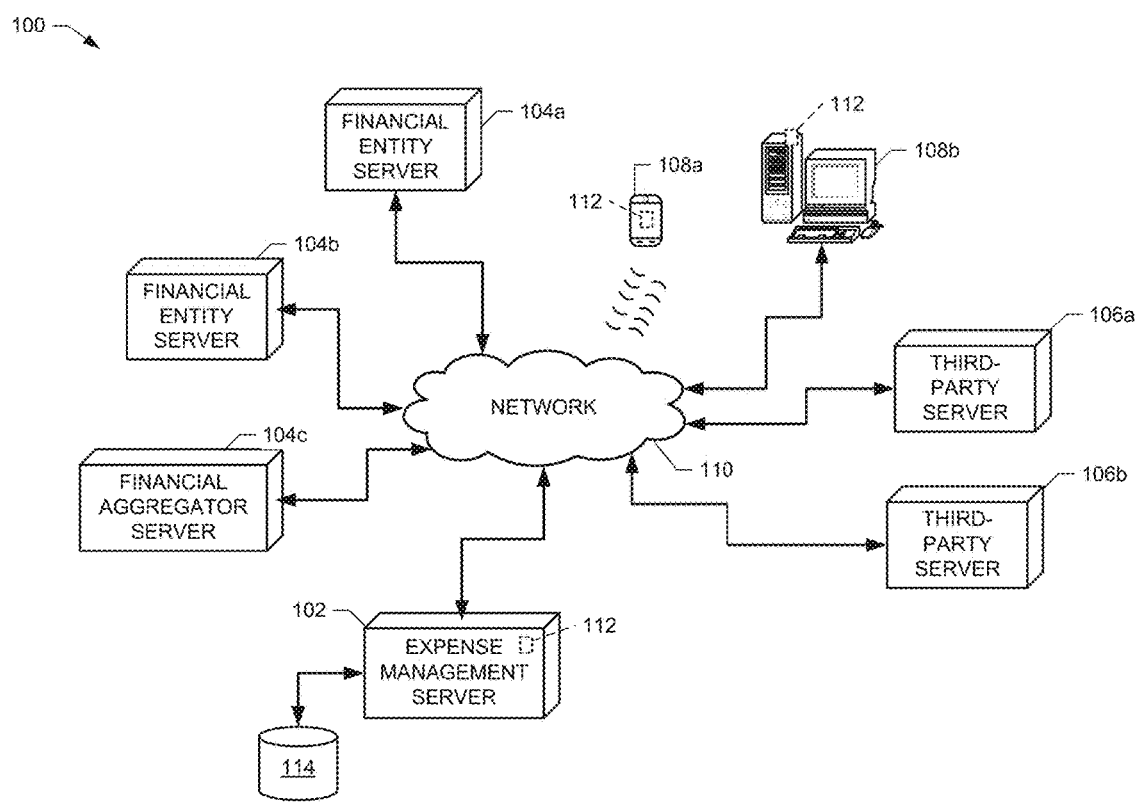
FIGS. 1 and 2 show diagrams of an example expense management environment that includes an expense management server, according to an example embodiment of the present disclosure.

The present disclosure relates in general to a method, apparatus, and system for expense report management. In particular, the example method, apparatus, and system disclosed herein are configured to compile financial transactions related to a user from one or more financial institutions or financial aggregators to enable the user to select which of the transactions are to be included within an expense report. The example method, apparatus, and system are configured to display all of the financial transactions within a single graphical user interface to make it appear that the transactions are locally stored and/or managed. However, the only time data from the transactions is locally stored or used in an expense report is only after the user has selected the transaction for inclusion in the report. This selective exclusion of some transactions from the expense report prevents a recipient of the expense report from viewing or otherwise having access to all of the transactions of an employee or contractor.

The example method, apparatus, and system disclosed herein also provide management features to help facilitate the creation of expense reports. For instance, the example method, apparatus, and system are configured to enable a user to search or filter transactions of multiple financial entities or aggregators based on merchant name, merchant type, date, location, etc. The filtering or searching enables a user to more quickly locate transactions that are relevant for a business expense, which is especially important when financial transactions are compiled or accumulated from a variety of different sources. The example method, apparatus, and system are also configured to interface with a third-party or employer to update the reimbursement status of expense reports or individual transactions. The example method, apparatus, and system are further configured to provide indications of which transactions have already been submitted during the creation of subsequent expense reports.

Moreover, the example method, apparatus, and system disclosed herein is configured to include one or more predictive algorithms that predict which transactions may be associated with a businesses expense based on previously submitted expense reports, one or more logic rules, and/or preferences provided by a user. For example, a user may consistently expense a phone bill from Vonage® to company A. The example method, apparatus, and system may be configured to search for any transactions where Vonage® is listed as the merchant and provide a flag or other visual indication that the transaction is to be expensed to company A. In other example, the method, apparatus, and system disclosed herein may determine that expenses incurred in Chicago, Ill. are to be expensed to company B (or a user may create a logic rule with such information). The method, apparatus, and system disclosed herein identify transactions that occurred in Chicago and provide appropriate visual indications with regard to an expense report for company B. In some instances, the example method, apparatus, and system may separate the predictions by dates. In the Chicago example, the method, apparatus, and system may identify two specific date ranges when the user was in Chicago. The method, apparatus, and system disclosed herein may query the user or provide an indication regarding the submission of two separate expense reports to company B for the two different date ranges. As can be appreciated from the forgoing description, the example method, apparatus, and system disclosed herein provide users with a powerful view into their financial data while only enabling a company's expense system to have access to specifically designated transactions.

The example method, apparatus, and system disclosed herein provide significant flexibility compared to known expense reimbursement systems, which are generally enterprise-specific. Presently, in certain industries, the traditional employee-employer model is shifting to more of a company-contractor, work-for-hire, or task-based model where a company many not want to invest in an enterprise-level expense reimbursement system that would not otherwise be accessible to individuals outside of the company (or to further distance individuals as being legally classified as employees of a company). The example method, apparatus, and system disclosed herein provide expense management that is separate from any enterprise-centric system that compiles transactions from multiple financial sources and provides for expense report creation that can be sent to any number of third-parties. Accordingly, a user is not restricted to which credit card or other financial instrument is used to incur business expenses. Further, a user may submit an expense report to any number of entities for which the user performs work without having to register or learn different reimbursement systems/protocols. All the while, each third-party only has access to transaction data that is specifically selected by the user with non-selected transaction data being selectively excluded.

The example method, apparatus, and system disclosed herein also provide third-parties with assurances that submitted transactions are valid. For example, as companies use more contractors, the company may not have checks and balances in place to ensure that submitted transactions are valid because the contractors do not have access to an enterprise-level reimbursement system. In other instances, the company may be small and have to trust independent submissions. The example method, apparatus, and system acquires transaction data directly from financial entities or aggregators to validate that each submitted transaction is valid and has not already been submitted to the same entity or a different entity.

As disclosed herein, a financial entity includes any bank, credit card company, or other organization that manages a charge or credit account on behalf of a user. The financial entity provides a user with a credit card, account number, electronic code, or other identifier that is accepted by merchants to pay for goods services. The financial entity maintains a data structure or list of transactions incurred by the user and periodically requests that the user provide payment for the transactions.

The disclosure also refers to a financial aggregator. As provided herein, a financial aggregator is an entity that compiles or aggregates financial transactions from one or more financial entities on behalf of a user. For instance, a financial aggregator may accumulate transactions for a user's one or more credit card(s), bank card(s), bank account(s), email account(s), reward account(s), investment account(s), etc. Examples of financial aggregators include Yodlee®, Mint™, Custodial Data by Advent®, AllData Aggregation by Fiserv™ eMoney™, and Wealth Access™.

References are made throughout to institution data, account data and transaction data. As disclosed herein, institution data includes, for example, information related a financial entity including, organization name, address, a site identifier, a Uniform Resource Locator ("URL"), etc. As disclosed herein, account data includes information related to a user account with the financial entity. Account data can include, for example, an account identifier, a user name, an account type, an account number, etc. Further, as disclosed herein, transaction data includes information related to a specific financial transaction changed to an account of a user that is managed by a financial entity. The transaction data, includes, for example, a transaction identifier, a description of the financial transaction, a merchant name, an amount, and a post date. It should be appreciated that the example types of information or data for each of the institution data, account data and transaction data is merely illustrative and can include additional type or fewer types of data. Moreover, financial aggregators may include additional information, such as site account identifiers, which are used to organize financial transactions of a user.

References are also made herein to defined data subsets of account data and transaction data. The defined data subsets are portions of the account data and transaction data that are available at financial entities or financial aggregators that provide enough information for a valid expense report. The example method, apparatus, and system use only the defined data subset of account and/or transaction data while selectively excluding other account data, transaction data, and institution data from inclusion in an expense report. Throughout the following disclosure, the defined data subset of account data includes an account identifier. However, in other embodiments, the defined data subset of account data may include other parameters or data fields including an account type, a financial entity name, financial aggregator identifiers or codes, account numbers, etc. Further, throughout the disclosure, the defined data subset of transaction data includes a transaction identifier, a description of the financial transaction, a merchant name, an amount, and a post date. However, in other embodiments, the defined data subset of transaction data may include fewer parameters or fields or additional parameters including a type of the financial transaction, a search identifier, a category identifier, etc.

Further, reference is made herein to the selective exclusion of some account data, transaction data, and institution data. In some embodiments, the exclusion occurs at the financial entity or financial aggregator where the example method, system, and apparatus are configured to only receive the defined data subsets (e.g., through one or more well-defined application program interfaces ("API"). Alternatively, the example system, method, and apparatus may request from the financial entity to receive only the defined data subset(s). In this manner, the example system and apparatus only receives the defined data subset(s). However, in other embodiments, the exclusion occurs at the example system or apparatus where generally all institution data, transaction data, and account data is received. In these other embodiments, the example system, method, and apparatus are configured to perform the exclusion locally such that only the defined data subset(s) pass through a filter or exclusion wall for processing into expanse objects for expense reimbursement management.

Expense Management Environment Embodiments

Figure 2:
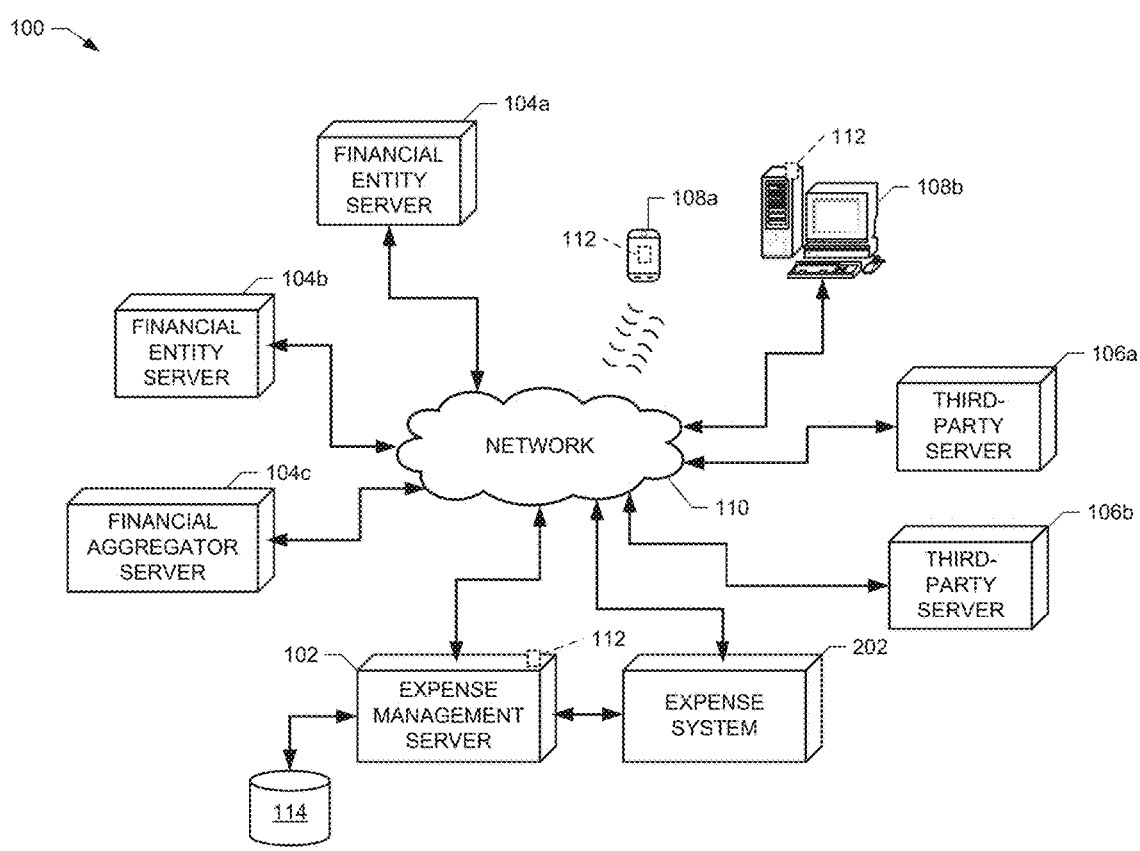

The example method, apparatus, and system disclosed herein may be embodied within the expense management environment 100 of FIGS. 1 and 2, according to examples of the present disclosure. The example expense management environment 100 includes an expense management server 102, financial servers 104, third-party servers 106, and user devices 108 communicatively coupled together via a network 110 (e.g., the Internet). The example management server 102, financial servers 104, third-party servers 106, and user devices 108 may include any smartphone, tablet computer, smart-eyewear, smartwatch, laptop computer, desktop computer, workstation, processor, server, etc.

In the illustrated example of FIG. 1, the example expense management server 102 is configured to receive financial transactions of users from the financial servers 104. As shown in this example, the expense management server 102 is configured to receive financial transactions from financial entity servers 104a and 104b, which may be related to or operated by a bank, a credit card company, a rewards program, etc. The expense management server 102 is also configured to receive financial transactions from the financial aggregator server 104c, which may compile or accumulate transactions from one or more financial entities. While FIG. 1 shows two financial entity servers 104a and 104b, and a financial aggregator server 104c, it should be appreciated that the expense management server 102 may receive financial transactions from any number of financial servers 104. Financial transaction data provided by the financial servers 104 is discussed in more detail in conjunction with FIGS. 3 to 6 below.

The example expense management server 102 is configured to receive or otherwise access the financial transactions and related data (e.g., institution data, account data, and/or transaction data) from the financial servers 104 and process the transactions for one or more expense reports. In some instances, the expense management server 102 is configured to access the financial servers 104 only after a user has requested to create an expense report. In other words, the expense management server 102 is not an information repository for all financial transactions of a user. Instead, the example expense management server 102 is configured to use the financial transaction data that is already stored at the financial servers 104 (and associated databases/memories).

The example expense management server 102 is configured to operate an expense report application 112 that is viewable on the user devices 108. The expense report application 112 is configured to enable a user to specify which accounts at financial entities (and/or financial aggregators) are to be accessed by the expense management server 102. A user may provide, for example, an account identifier, a username, and a password related to each financial entity. The expense management server 102 uses the information provided by the user to authenticate or otherwise obtain access to the sensitive financial transactions of the user stored at the financial servers 104.

The example application 112 is also configured to display a graphical user interface that includes the financial transactions of the user that have been accessed by the expense management server 102. In this manner, the expense report application 112 in conjunction with the expense management server 102 provides the appearance to the user that all of the financial transactions (related to different financial entities/aggregators) are managed and stored at a single location. From this perspective, a user may view, sort, filter, hide, etc. the transactions to determine which transactions are to be included within an expense report. The example expense report application 112 records which transactions are selected by a user and communicates the selection in one or more messages to the expense management server 102.

Responsive to receiving the message(s), the example expense management server 102 is configured to create and/or include information from the selected transactions to an expense report. However, the example expense management server 102 does not simply pull or copy all the account and transaction data for the report. Instead, the expense management server 102 is generally configured to request or copy only enough transaction data (e.g., a defined data subset of the transaction data) to provide validation or verification for a third-party. The data usually only includes transaction data comprising a transaction identifier, a description of the financial transaction, a merchant name, an amount, and a post date. The expense management server 102 is configured to accordingly use only the subset of all available transaction data for the expense report. The other transaction data and account data that is not included in the report is selectively excluded in addition to the transactions not selected by the user. This selective configuration ensures that the third-party recipient of the expense report only has transaction data for transactions being submitted for reimbursement, nothing more.

The example expense management server 102 may also store the transaction data used for the expense report in a memory 114. As illustrated in FIG. 1, the memory 114 is local relative to the expense management server 102 for the purpose of storing transactions or expense objects that have been selected for inclusion in an expense report. The memory 114 may also store expense reports, third-party information, user information, and/or rules, algorithms, and/or instructions for filtering and/or displaying transactions (e.g., expense objects) in a graphical user interface. In some instances, the memory 114 may be provided through a cloud-based storage system. The storage of transactions submitted in an expense report also enables the expense management server 102 to provide verification that the same transaction is not submitted twice or to different third-party entities.

The example expense management server 102 is configured to transmit or otherwise provide expense reports to third-party servers 106 for expense reimbursement. The third-party servers 106 may include one or more computers or servers of an enterprise, company, institution, individual, etc. that provides payment for expenses incurred. In addition to expense reports, the example expense management server 102 may also be configured to generate expense summary reports for all or some subset of expense reports or forms submitted to the third-party. The example expense management server 102 may also be configured to provide expense report information as part of a business workflow for automated expense reimbursement. For example, the expense management server 102 may access API of the third-party server 106 to provide expense report information directly into a reimbursement system of the respective third-party.

FIG. 2 shows another embodiment of the expose management environment 100. In this example, the environment 100 additionally includes an expense system 202 that is configured to manage reimbursement for a third-party. In this embodiment, the example expense management server 102 in conjunction with the expense report application 112 is configured to operate as an interface with the expense system 202 such that only certain specified transaction data is provided. For instance, some third-parties may contract or use an expense reporting system such as an enterprise-level system. The expense reporting system requires that expense items be structured in a certain format and include certain information to be approved for reimbursement. The expense management server 102 is configured to collect the transactions from the financial entities, similar to the example described in conjunction with FIG. 1. However, in the example of FIG. 2, after a user has selected which transactions are to be included within an expense report, the example expense management server 102 is configured to populate the transactions directly into the expense system 202 without generating an expense report or sending an expense report/form. The example expanse system 202 may interact with the third-party servers 106 through any approval or payment process until reimbursement is complete.

Expense Data Management Embodiments

Figure 3:
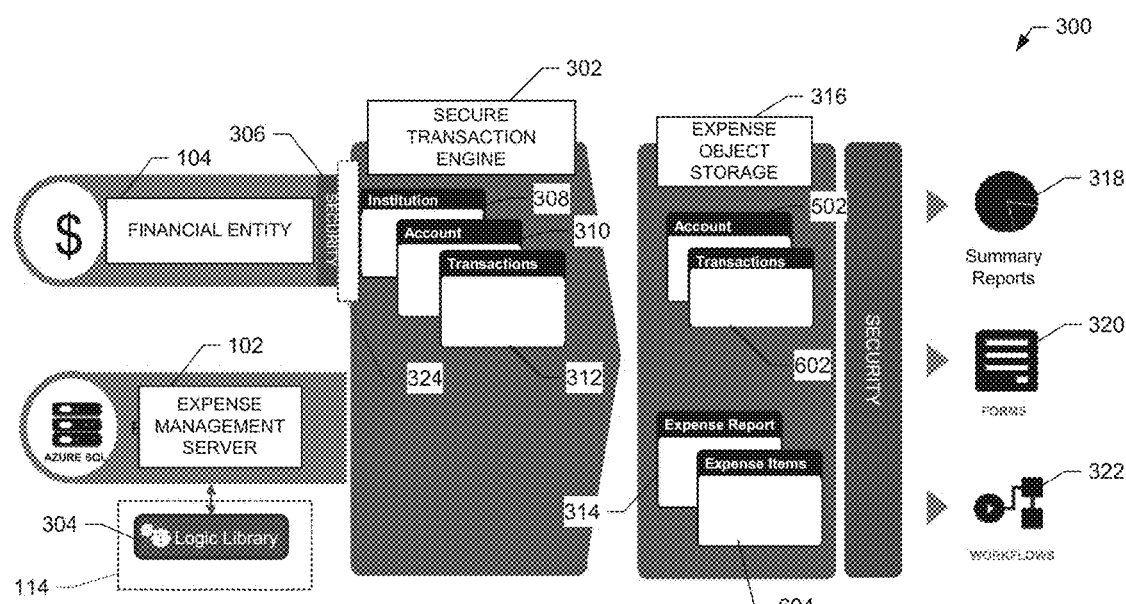
FIG. 3 shows a diagram of representative of expense data management performed within the example expense management environment of FIGS. 1 and 2, according to an example embodiment of the present disclosure.

FIG. 3 shows a diagram of representative of expense data management 300 performed within the example expense management environment 100 of FIGS. 1 and 2, according to an example embodiment of the present disclosure. In the illustrated example, the expense management server 102 operates a secure transaction engine 302 that is configured to process transaction related data into expense objects or items for inclusion in an expense report or expense form. It should be appreciated that the example illustrated in FIG. 3 is only one embodiment of the expense management environment 100. Other examples could include different frameworks and/or include fewer or additional types of information, transaction-related data, expense items, etc.

The example expense management server 102 includes or is communicatively coupled to the memory 114, which includes a logic library 304. The memory may include, for example, an Azure SQL database to operate the logic library 304 and/or to manage one or more rules, algorithms, or computer-readable instructions that specify how transactions are to be filtered, searched, flagged, etc. The database may also be used for storing certain transaction data selected by a user.

The logic library 304 may include a framework that enables a user to create their own rules. For example, a user may create a rule that flags transactions associated with a certain geographic location or date range for inclusion in a certain expense report. Additionally, the logic library may include adaptive rules that are automatically created by the expense management server 102 based on previous transaction selections by a user. For example, the expense management server 102 may determine that certain transactions of a specific geography, date range or recurring date pattern, or related to a certain merchant are consistently being expensed to a certain company. Accordingly, the expense management server 102 is configured to create one or more rules to reflect the identified user patterns.

The example secure transaction engine 302 of the server 102 interfaces with the financial servers 104 to receive institution, account, and transaction data. The secure transaction engine 304 may be configured to access the servers 104 through a security component 306. In some examples, the security component 306 may include a log-in interface to the financial servers 104. A user of the expense management system 102 may provide one or more sets of credentials (e.g., a username and password) to access the server 104. However, the expense management server 102 may not store the username and password, which may require a user providing this information every time a financial entity is accessed or may not be needed if the server 102 is validated with the financial entity and only needs to provide a user and/or account identifier. For financial aggregators, the credentials may include a first set to access one or more aggregated financial entities and a second set related to the financial aggregator.

Figure 4:
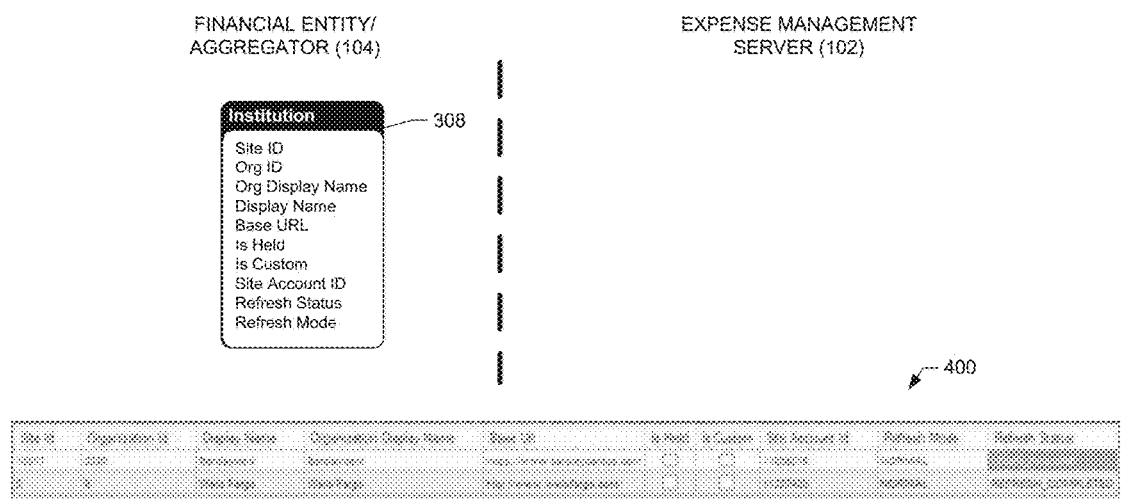
FIG. 4 shows a diagram of institution data that may be available at a financial server of the expense management environment of FIGS. 1 to 3, according to an example embodiment of the present disclosure.

As discussed above, the expense management server 102 through the secure transaction engine 302 is configured to receive institution data 308, account data 310, and transaction data 312. FIG. 4 shows a diagram of the institution data 308 that may be available at the financial server 104, according to an example embodiment of the present disclosure. The institution data 308 includes for example, a site identifier (e.g., an identifier internal to the financial server 104), an organization identifier, an organization name, a URL of the organization, an indication whether the institution is held or custom, a site account identifier (e.g., an identifier of a financial institution related to the financial server 104 or accessible by the financial server 104), and refresh information. Some of this information may only be used for a financial aggregator where some fields are used to link back to a financial entity or differentiate between different entities.

As shown in FIG. 4, the example application 112 on the user device 108 may display a graphical user interface 400 that shows the institution information. In other instances, the data displayed in the user interface 400 is data received by the secure transaction engine 302 but not necessarily shown to the user. The securer transaction engine 302 may use the data shown in the user interface 400 to access underlying accounts associated with the financial entity. In some examples, at least some of the displayed information may be used by the user to select at the application 112 one or more financial entities to receive the corresponding transactions. For instance, a user may select the Wells Fargo® entity to view all transactions that are at the related Wells Fargo® account. The information may also be used to provide verification to the user regarding which financial entities are providing transactions. However, as the institution data 308 does not include any transaction specific information, the example secure transaction engine 302 of the expense management server 102 does not use or save this information in an expense report.

Figure 5:
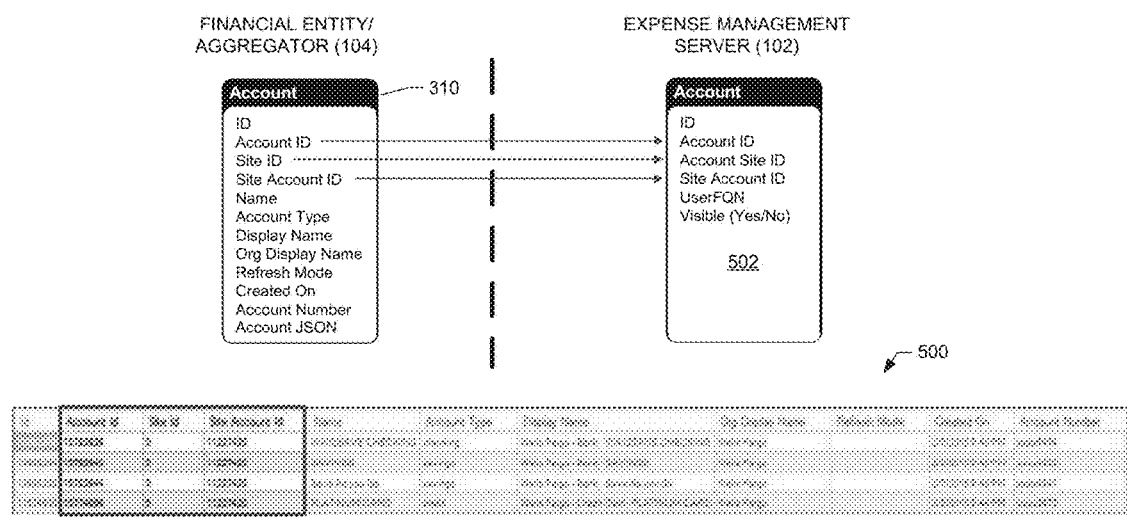
FIG. 5 shows a diagram a diagram of account data that may be available at the financial server of the expense management environment of FIGS. 1 to 3, according to an example embodiment of the present disclosure.

FIG. 5 shows a diagram of the account data 310 that may be available at the financial server 104, according to an example embodiment of the present disclosure. The account data 310 includes a user identifier, an account identifier, a site identifier, an account name, an account type, a display account name, a financial entity name, refresh information, an account creation date (either a date the account was added to a financial aggregator or created by the financial entity), and an account number. The account data 310 may also provide an indication or information related to JavaScript Object Notation ("JSON"). Similar to the institution data 308, some of the account data 310 may only be used for a financial aggregator where some fields are used to link back to an account at a financial entity or differentiate between different accounts.

The example application 112 on the user device 108 is configured to display a graphical user interface 500 that includes the account data 310. However, only a defined data subset 502 of the account data is stored at the expense management server 102 and/or used in an expense report. For instance, the defined data subset 502 includes a user identifier, an account identifier (e.g., an identifier of a user's account for linking accounts to transactions), an account site identifier (e.g., an identifier of a financial aggregator related to the financial server 104), a site account identifier (e.g., an identifier of a financial institution or financial server 104), a user fully qualified name ("FQN") and/or an indication whether transactions from the account are to be displayed to a user for expense reimbursement. Of this data, only the account identifier, the account site identifier, and the site account identifier are received from the financial server 104, which may be the minimal amount of data necessary to link or trace back to the user's account. In some instances, only this data (or a portion of this data such as only the account identifier) is displayed by the application 112 in the user interface 500. It should be appreciated that no account balance information, password, or other sensitive information is stored by the expense management server 102. However, in some embodiments, the server 102 may store a username and/or password related to a user account at the financial aggregator server 104c. In these embodiments, the server 102 may instead store a secondary username and/or password for accessing the financial aggregator server 104c through the server 102.

The example application 112 in conjunction with the server 102 is configured to enable a user to select which accounts are to be accessed for retrieving transactions for expense reimbursement. For example, a user may have multiple accounts at the same financial entity. A first account is a joint account with a spouse, a second account is a personal account, and a third account is a credit card. However, only the second and third accounts are used for expense items. The user may accordingly use the application 112 to hide the first account so those transactions are not shown in a transaction grid of the user interface 500 and/or user interface 900 of FIG. 9.

Figure 6:
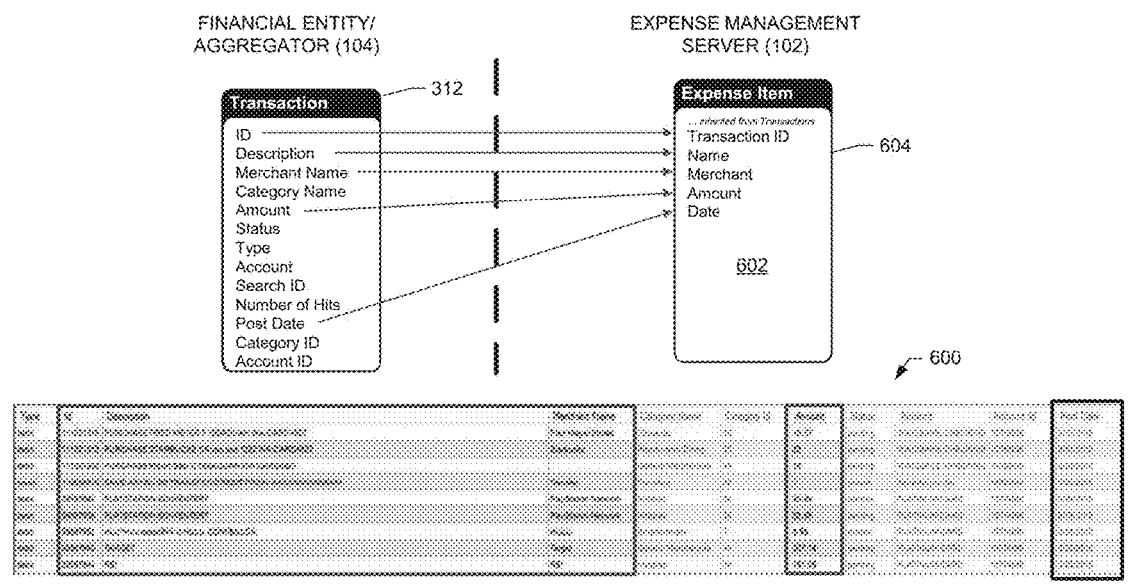
FIG. 6 shows a diagram a diagram of transaction data that may be available at the financial server of the expense management environment of FIGS. 1 to 3, according to an example embodiment of the present disclosure.

FIG. 6 shows a diagram of the transaction data 312 that may be available at the financial server 104, according to an example embodiment of the present disclosure. The transaction data 312 includes a transaction identifier, a description, a merchant name, a category name, an amount, a status, a transaction type (e.g., debit or credit to the account), an account name, a search identifier, a number of hits, a post date, a category identifier, and an account identifier. The transaction data 312 may also include an address (or other geographic data) of the merchant that created the transaction. The example secure transaction engine 302 is configured to select from the transaction data 312 a defined data subset 602 of the transaction data 312. The defined data subset 602 includes information that is needed to prove the transaction is valid and can be reimbursed. As illustrated, the defined data subset includes the transaction identifier, the description of the transaction (illustrated as the 'Name' field in the defined data subset 602), the merchant name, the amount, and the post date. Other examples can include additional or less data depending on, for example, a requirement of a third-party or the expense system 202.

The example application 112 is configured to display a graphical user interface 600 that includes transactions associated with selected accounts. The data shown in the user interface 600 may be received by the secure transaction engine 302. However, only the defined data subset 602 may be actually displayed to the user. In other instances, all of the transaction data 312 is displayed by the application 112.

The example secure transaction engine 302 is configured to create an expense item or object 604 based on the defined data subsets 502 and 602. The expense object 604 may include a database entry, structured data, HTML code, XML code or files, or other coded item that includes the defined data subsets 502 and 602 of account and transaction data. For example, the expense object 604 may include data definitions or properties related to the defined data subsets 502 and 602 and one or more actions or methods with regard to an expense report (e.g., add to expense report '5A'). The purpose of the defined expense object is to provide the secure transaction engine 302 with a consistent structure for storing the defined data subsets 502 and 602 of the transaction data and account data and formatting the defined data subsets 502 and 602 into inclusion in an expense report.

Returning to FIG. 3, the secure transaction engine 302 is configured to create expense items or objects 604 for only the transactions selected by a user for inclusion in an expense report 314. Collectively, the secure transaction engine 302 stores the expense objects 604 in an expense object storage 316 of the memory 114. The secure transaction engine 302 may also store the expense reports 314 to the expense object storage 316. The example secure transaction engine 302 is configured to associate, relate, or otherwise include the expense objects 604 into the appropriately designated expense report 314. This may include, for example, creating an expense report file or form and including information from each of the associated expense objects within the form such that the same properties are displayed in the same sections.

The example secure transaction engine 302 is configured to provide the expense objects in one or more expense summary reports 318, expense forms 320, and/or expense workflows 322 based on preferences of the third-party. The example form 320 includes an expense report having the defined data subset of data that is used for reimbursement. The example summary reports 318 include data from one or more expense reports transmitted to the third-party. The summary reports 318 may include data from one user or a plurality of users. The expense workflow 322 includes an automated process for expense reimbursement where the defined data subsets 502 and 602 are provided to an expense system as part of a reimbursement workflow process. The workflow 322 may also relate to other business processes, such as, for example, accounting, expense tracking, reconciliation, etc.

Expense Management Server Embodiment

Figure 7:
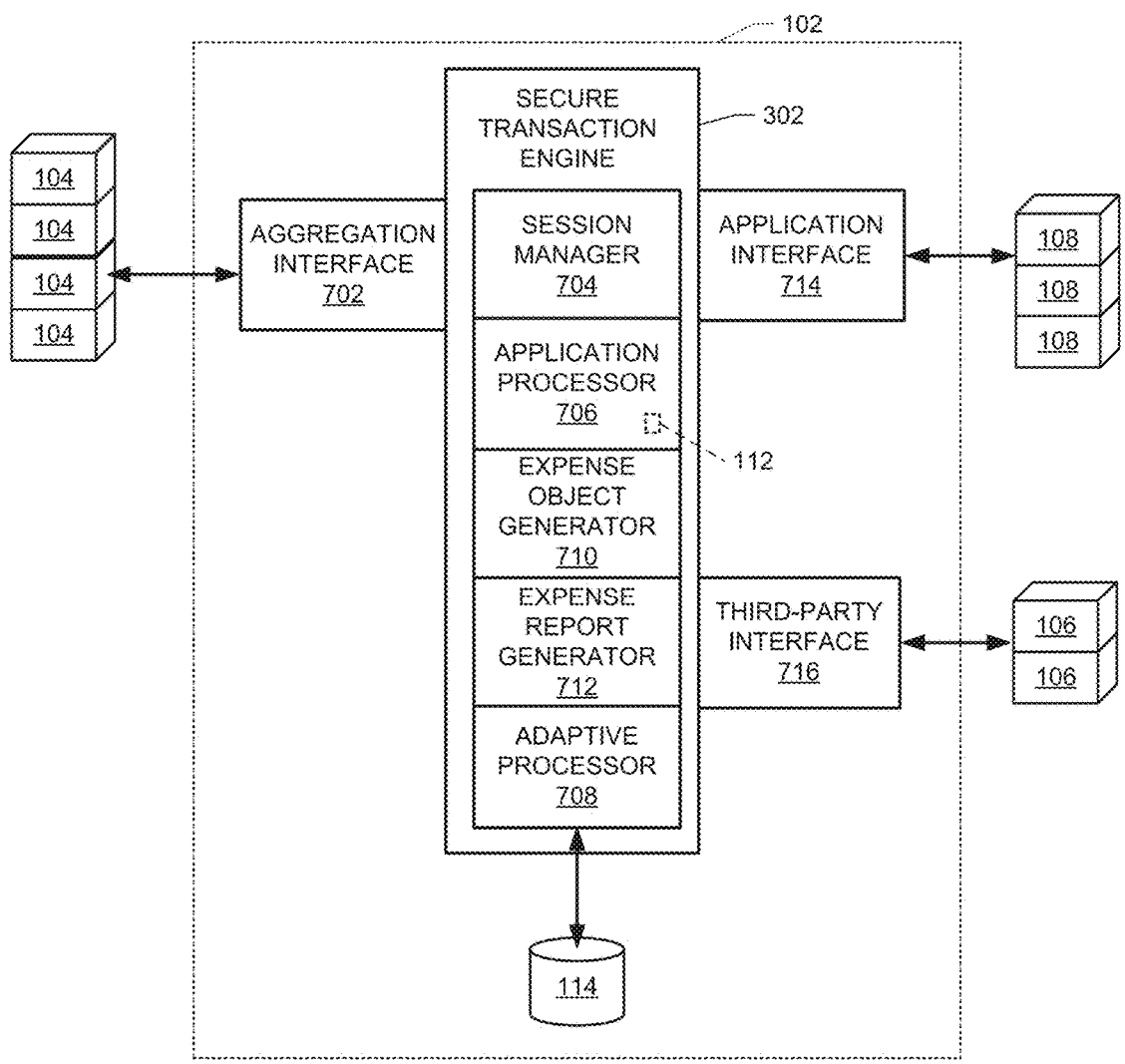
FIG. 7 shows a diagram of the example expense management server of FIGS. 1 to 3, according to an example embodiment of the present disclosure.

FIG. 7 shows a diagram of the example expense management server 102 of FIGS. 1 to 3, according to an example embodiment of the present disclosure. The expense management server 102 includes the secure transaction engine 302 communicatively coupled to the memory 114. In some examples, the memory may be external to the expense management server 102. Further, at least some of the expense management server 102 and/or the memory may be configured in a virtualized, distributed, and/or cloud computing environment.

I. Aggregation Interface

The example expense management server 102 includes an aggregation interface 702 configured to receive institution data, account data, and transaction data from one or more financial servers 104. The example aggregation interface 702 may use one more user credentials to access the data at the financial server(s) 104. In some instances, aggregation interface 702 is configured to access an API of the financial servers 104 to receive the data in a well-defined format. In these instances, the aggregation interface 702 may be provided a secure connection, such as a virtual private network ("VPN") path or tunnel to one or more sockets or ports at the financial servers 104. In other of these instances, the aggregation interface 702 may access the financial servers 104 through a public or semi-public access point that requires at least some verification of the expense management server 102 and/or verification for a user for whom data is being requested.

In some instances, the financial servers 104 may not have a well defined API or framework for providing defined data. In these instances, the aggregation interface 702 may transmit a request for at least some data stored at the financial server 104 that is related to a particular user. In these instances, the aggregation interface 702 is configured to read data labels and/or parameters to determine how the data is to be organized as institution data, account data, and transaction data.

The example aggregation interface 702 is configured to request or otherwise obtain the data from the financial servers 104 upon a specific request from a user. In other words, the aggregation interface 702 is configured to obtain the data at times when a user is creating (or planning to create) an expense report. In some examples, the aggregation interface 702 is configured to obtain from the financial server all the institution data 308, the account data 310, and the transaction data 312 that is related to a user. In other examples, the aggregation interface 702 may only request certain defined data subsets of the institution data 308, the account data 310, and the transaction data 312 that is sufficient to enable a user to view institution, account, and transaction data. In either example, the aggregation interface 702 only obtains the institution data 308, the account data 310, and the transaction data 312 for as long as the user is creating an expense report so that the data 310 to 312 can be displayed by the application 112.

For users with multiple accounts, the aggregation interface 702 is configured to request data 310 to 312 from multiple financial servers 104 and/or receive the data 310 to 312 from a financial aggregator. In either case, the example aggregation interface 702 is configured to combine (i.e., aggregate) the data 310 to 312 such that at least some of the data is displayed to the user via the application 112 as though the data is stored and/or managed by the expense management server 102. In instances where data comes from multiple financial servers 104, the example aggregation interface 702 is configured to combine the data by matching field names and/or parameters such that all institution data, account data, and transaction data can be organized and displayed within tables, lists or user interfaces (e.g., the user interfaces 400, 500, and 600). After combining the data 310 to 312, the example aggregation interface 702 is configured to transmit the combined data to the secure transaction engine 302.

II. Secure Transaction Engine—Session Manager

The example secure transaction engine 302 of the expense management server 102 includes a session manager 704 configured to handle data management when a user creates an expense report. As discussed above, only defined data subsets of transaction data 312 and the account data 310 are stored and used by the secure transaction engine 302 in an expense report. The remainder of the transaction data, account data, and institution data is discarded after the expense report is created or after a user has closed the application 112. The example session manager 704 is configured to create a session when a user opens the application 112 and/or creates an expense report. After opening a session, the session manager 704 transmits a message to the aggregation interface 702 identifying the user and the session. The session manager 704 then receives data 310 to 312 from the aggregation interface 702 and associates the received data 310 to 312 to the created session. The session manager 704 may then make the data 310 to 312 available for processing and application management.

Later, when the user ends the session, the session manager 704 is configured to discard or otherwise delete the data 310 to 312. Discarding the data may include removing the data 310 to 312 (or any trace or ability to reconstruct the data 310 to 312) from any cache or temporary memory of the expense management system 102. The session manager 704 may discard all the data 310 to 312 regardless of which expense objects were stored to the memory. The session manager 704 may also delete (or cause the deletion of) expense objects that were not selected for an expense report. The session manager 704 is accordingly configured to prevent the secure transaction engine 302 from becoming a data repository itself, which is the purpose of the financial servers 104. The deletion of the data after the session also provides a safeguard from unauthorized access by a third-party.

III. Secure Transaction Engine—Application Processor

The example secure transaction engine 302 of the expense management server 102 includes an application processor 706 configured to manage the display of data in the application 112 and process inputs from a user received via the expense report application 112. The example application processor 706 is configured to operate in conjunction with the application 112 operating on the user device 108. In some instances, the application processor 706 may transmit XML and/or HTTP code in one or more messages to the expense report application 112, which may be operating within a web browser or separately. The application 112 is configured to render the received code into one or more user interfaces configured to enable a user to create expense reports.

In other examples, the application processor 706 is configured to operate the application 112 locally and transmit snapshots of the one or more user interfaces. The snapshots may be accompanied by one or more fields or interaction features such that the application 112 displays only an image of the interface. The application 112 records the user's interaction with the fields and reports this information back to the application processor 706, which then performs the appropriate operations. Such a configuration may be desirable to provide additional security since the actual transaction and/or account data is never transmitted, only an image of the data that cannot be read by an automated bot or malicious application.

Figure 8:
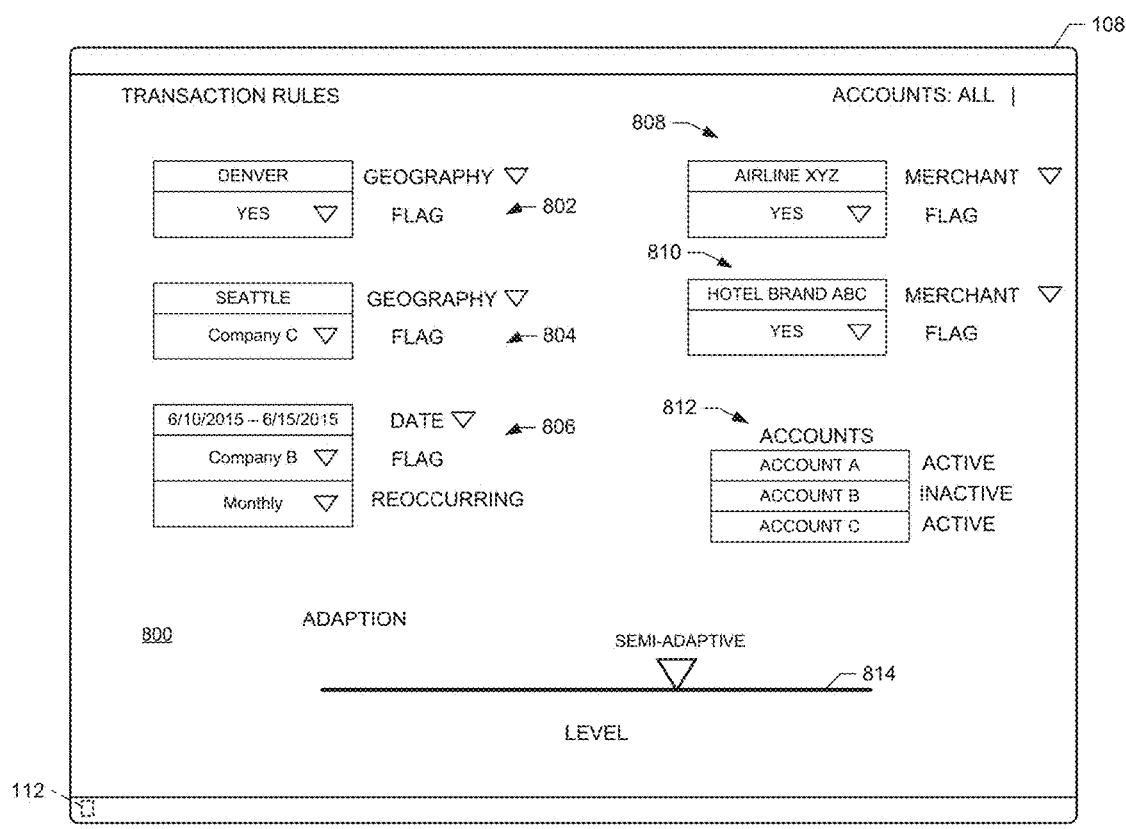
FIG. 8 shows a diagram of an example user interface that enables a user to create rules for the expense management server of FIGS. 1 to 3, according to an example embodiment of the present disclosure.

The application processor 706 is also configured to provide an interface that enables a user to create rules, instructions, or algorithms for filtering and/or flagging certain transactions. The rules are stored to the logic library 304 of the memory 114. FIG. 8 shows a diagram of an example user interface 800 that may be managed by the application processor 706 and displayed by the expense report application 112 at the user device 108. The example user interface 800 includes settings or rules that enable a user to flag transactions that match specified criteria. For instance, a user may create a first rule 802 that is geography-based where any transactions from a merchant in Denver are to be flagged. In response, the application processor 706 may search for transactions during a session for the user where Denver is included within the merchant field or description field. Responsive to finding a match, the application processor 706 may flag the transaction by providing a graphical or visual indication including highlighting the transaction in-line, displaying an icon such as a triangle or star, etc.

As illustrated in FIG. 8, the user interface 800 includes other rules 804, 806, 808, and 810 that may be been created by the user and/or created by an adaptive processor 708 of the secure transaction engine 302. Each of the rules 802 to 810 includes a criteria type, which may be selected from a list of available criteria or entered manually. The criteria type specifies which parameters or fields of the transaction and/or account data are to be searched (e.g., merchant for geography criteria, date for date criteria, merchant for merchant name, etc.). The flag field enables a user to specify how the flag is to be displayed. For example, the flag for rule 802 is a general flag that provides an indication that a transaction should be expensed. However, the flag for rule 804 provides an indication that the transaction should be expensed to Company C. In addition, rule 806 includes a field regarding whether the rule is to be applied on a recurring basis. Rules 808 and 810 reflect that a flag will be provided for all transactions associated with a certain airline or hotel brand. Each of the rules 802 to 810 are stored by the application processor 706 to the memory 114 and accessed for each session opened or started for the user.

The example user interface 800 is also configured to display account data to the user. For example, the user interface 800 includes an account section 812 that enables a user to select which accounts are to be used for displaying transactions. The user interface 800 is configured to determine the accounts based on information provided by a user during account registration. The user interface 800 enables a user to select any of the accounts, which causes the expense report application 112 to send a message to the application processor 706 identifying the selected account. In response to the message, the application processor 706 is configured to determine the account data 310 associated with the selected account. The application processor 706 transmits either the account data 310, as shown in the user interface 500 and/or the defined data subset 502 of the account data for display by the expense report application 112 in the user interface 800 or a separate user interface.

The example user interface 800 also includes an adaptive setting 814 configured to enable a user to select an adaption level. As discussed in more detail in conjunction with the adaptive processor 708, the secure transaction engine 302 is configured to learn which transactions or types of transactions a user consistently selects for an expense report. After a certain threshold is reached, the adaption processor 708 may automatically create one or more rules. The adaptive setting 814 enables a user to set the threshold regarding when rules are created. For example, the semi-adaptive setting may set a threshold in which a rule is only created after four of the same types of transactions are used in an expense report.

It should be appreciated that the rules 802 to 810 shown in FIG. 8 are only illustrative of the rules that may be stored at the logic library 304 discussed in conjunction with FIG. 3. The logic library 304 may also include algorithms and/or instructions that, when executed, cause the application processor 706 to filter, flag, hide, group, etc. expense objects created from the defined data subsets 502 and 602. In some instances, the rules, algorithms, and/or instructs may specify whether the application processor 706 is to refrain from providing some data subsets 502 and 602 to the expense object generator 710, thereby ensuring that those transactions are not displayed to a user or available for inclusion in an expense report.

As discussed above, the example application processor 706 of FIG. 7 is configured to display at least the defined data subsets 502 and 602 of data via the application 112 on the user device 108. The application processor 706 may receive, for example, an indication that a user has opened or otherwise accessed the expense report application 112. In response, the application processor 706 instructs the session manager 704 to begin a session and obtain institution, account, and/or transaction data related to the user from the financial server(s) 104. The application processor 706 then applies one or more rules, algorithms, or sets of instructions to the received data to determine what is to be displayed to the user. For example, the application processor 706 may determine that the institution data 310 is not to be displayed while only the defined data subsets 502 and 602 of the account and transaction data are to be displayed. In some instances, only the defined data subset 602 may be displayed with the defined data subset 502 being available for display upon request by the user. In this manner, the example application processor 706 includes an exclusion wall that prevents display of some of the data 308 to 312 to the user, which accordingly prevents the inclusion of the excluded data in an expense report.

In other examples, an exclusion wall (as shown in FIG. 3 as exclusion wall 324) may be located at the session manager 704 and/or the aggregation interface 702 so as to prevent the reception (or deletion after reception) of the data 308 to 312 that is not be used or displayed to the user. For example, the exclusion wall may include a filter or a well-defined API located at the aggregation interface 702. The filter may selectively remove data with labels that match exclusion criteria. Alternatively, the filter or API may only allow certain data to pass that has certain a label or parameter. In yet other examples, the exclusion wall may instruct the financial entity 104 to transmit only the defined data subsets 502 and 602 of data. For instance, the exclusion wall may only request certain fields or parameters of an API at the financial server 104.

In addition to the rules discussed above, the example application processor 706 may be configured to flag or highlight certain transactions based on third-party criteria or general user preferences. For example, some third-parties will not reimburse transactions that over a certain period of time, such as 30, 60, or 90 days. The example application processor 706 may compare a post date of the transactions to a current data and determine a difference. The application processor 706 may then compare the difference to a threshold. Transactions that exceed or are within a certain number of days to the threshold may be flagged or highlighted to being attention to the user of an approaching deadline with respect to the transaction. In some instances, the application processor 706 may hide transactions that exceed the threshold.

To facilitate the display and inclusion of the defined data subsets 502 and 602 of transaction and account data into an expense report, the example application processor 706 is configured to transmit one or more messages to an expense object generator 710 to create business or XML objects for each of the transactions. This also ensures uniformity of the data depicted for the transactions. The expense object generator 710 provides the application processor 706 with the expense objects (e.g., the expense object 604) and transmits the expense objects to the expense report application 112 for display.

Figure 9:
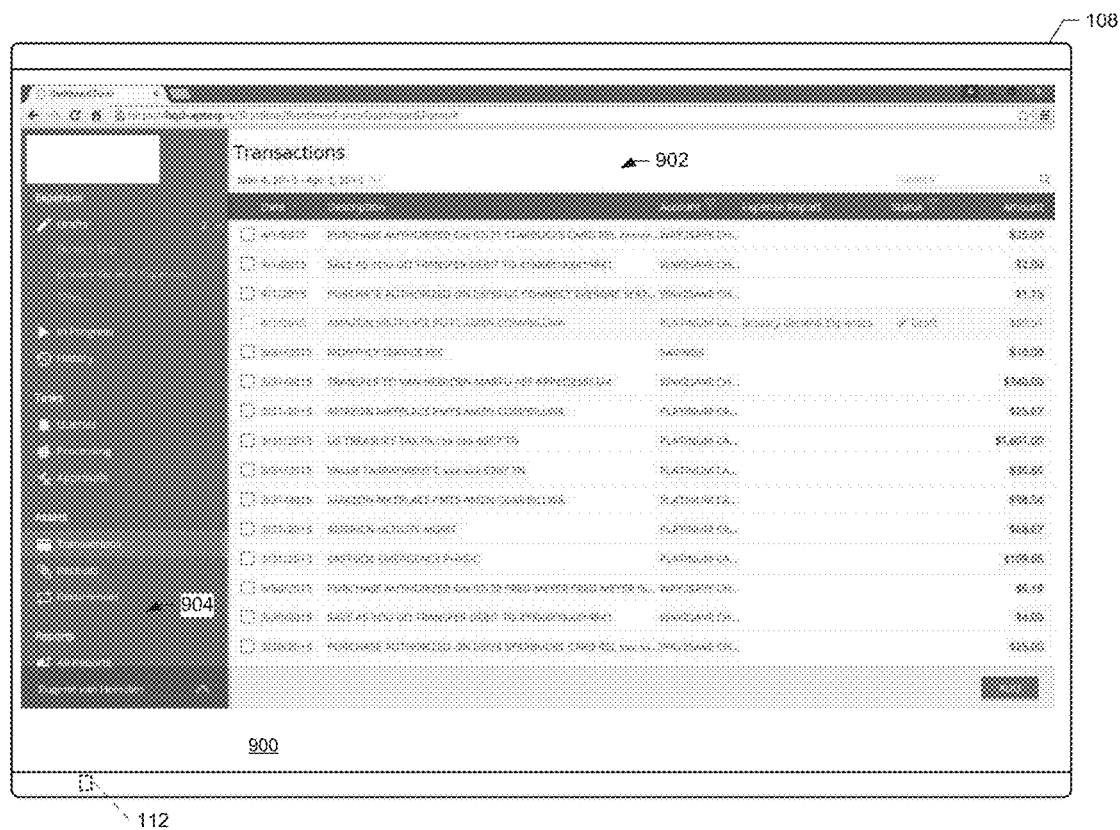
FIG. 9 shows a diagram of a user interface that displays transactions as expense objects provided by the expense management server of FIGS. 1 to 3, according to an example embodiment of the present disclosure.

The example application processor 706 is configured to cause the expense objects (i.e., information from the expense objects) to be displayed by the expense report application 112 to provide the appearance that the financial data is locally at the expense management server 102. This appearance includes the combination of data from multiple financial servers 104 and/or accounts to provide the user with a view of all transactions (contained to selective information) across multiple accounts. FIG. 9 shows a diagram of a user interface 900 that may be displayed by the expense report application 112 on the user device 108 using the expense objects provided by the application processor 706.

The example user interface 900 shows a grid or list section 902 of transactions for accounts flagged to be viewed. The transactions shown include information from expense objects created by the expense object generator 710. The list includes fields for expense object information including a transaction date, a transaction description, an account identifier, an indication of whether the transaction has been added to an expense report (and an identifier of the expense report), a reimbursement status of the transaction, and an amount. Each of these fields is a parameter of label within the expense object. The example user interface 900 may also graphically flag certain transactions based on instructions received from the application processor 706 regarding a match to one or more rules.

The example user interface 900 enables a user to select which of the expense objects are to be included within an expense report. Selection by a user causes the expense report application 112 to transmit a message to the application processor 706 indicative of the selection. The application processor 706 modifies the selected expense objects to include an action for inclusion within the specified expense report. An expense report generator 712 of FIG. 7 is configured to combine all of the expense objects with the same action and target expense report identifier into a file or data structure for the expense report.

The example user interface 900 may also enable a user to select to hide certain transactions. Selection of transactions to hide causes the application processor 706 to store a corresponding transaction identifier within a list of transactions that are to be hidden from view during the current session and future sessions. The hiding of transactions enables a user to view only those transactions relevant for expense reimbursement and as a way to provide information to the adaptive processor 708 regarding which transactions are to be displayed.

Returning to FIG. 9, in addition to the list section 902, the example user interface 900 includes a management section 904 that provides options to the user for viewing and/or managing transactions. For example, the 'New' item in the management section 904 enables a user to create a new expense report. The 'Expense' section shows already created expense reports that have not yet been submitted. The 'History' item is configured to cause the expense report application 112 to show the user a history of when transactions were added to an expense report. The 'Task' section within the management section 904 provides options for a user to view a status of an expense report. For example, selection of the 'Processing' item causes the application processor 706 to determine a status of a submitted expense report from a third-party server 106. Additionally, selection of the 'Approvals' item causes the application processor 706 to determine an approval chain of a submitted expense report from a third-party server 106. In some instances, the third-party server 106 may transmit periodic updates for an expense report such that the 'Processing' and 'Approvals' information is readily available at the server 102. The example 'Assets' section enables a user to switch between the electronic transactions displayed within the list section 902 and manually entered receipts. For instance, the expense report application 112 may be configured to enable a user to enter receipt information or acquire a picture of a receipt and use OCR to determine transaction data. The user interface 900 is configured to enable a user to combine transaction received from a financial entity with user provided receipts in a single expense report.

As discussed above, the example defined data subset 602 includes a transaction identifier, a description of the financial transaction, a merchant name, an amount, and a post date. In some examples, the defined data subset 602 may also include transaction type (e.g., credit or debit). The application processor 706 may be configured to use the transaction type field to determine whether the transaction is a charge to the user or a credit payment to the user. The application processor 706 may only request that expense objects are created for debit transactions to prevent a user for adding an expense object to an expense report for a transaction in which the user received money.

IV. Secure Transaction Engine—Expense Object Generator

The example expense object generator 710 of the secure transaction engine 302 of FIG. 7 is configured to convert the defined data subsets 502 and 602 into expense or business objects. The expense object generator 710 receives the defined data subsets 502 and/or 602 from the application processor 706. The expense object generator 710 is configured to create an expense object from each data subset related to a transaction. The expense object generator 710 uses data labels, fields, or parameters within the data subsets to identify a data value for the corresponding field or label in the expense object.

In an example, the expense object may include an XML object with labels for account identifier, transaction identifier, transaction description, merchant name, amount, and post date. The expense object generator 710 is configured to read, for example, a file or list that includes the data subsets 502 and 602 for labels or fields that match the labels or fields in the XML object. For each match, the expense object generator 710 stores the value of the matched label to the label or parameter in the XML object. The example expense object generator 710 transmits the created expense objects to the application processor 706 for display by the expense report application 112.

The example expense object generator 710 is also configured to specify actions or methods for each of the expense objects. For example, the application processor 706 may compare the defined data subsets 502 and 602 to one or more rules, as discussed in conjunction with FIG. 8. Responsive to determining that data subsets 502 and 602 of a transaction are to be flagged or otherwise highlighted, the application processor 706 provides an indication of the flag in the request message to the expense object generator 710 to create the expense object. In response to the message, the expense object generator 710 is configured to create the expense object and specify an action to display a flag or other graphical representation. In instances where the indication from the application processor 706 includes information, such as a company name, the expense object generator 710 is configured to store the provided information to the action or method field as text to be displayed. The expense object generator 710 may also specify other actions, including, an action to hide an expense object from display (but make the object searchable), highlight the expense object as already being included in another expense report, an indication of an approval status of an expense object, an indication of a payment status of an expense object, a link to a photograph of a receipt, etc.

The example object generator 710 may also update the expense object based on a selection by a user to include the expense object in an expense report. For instance, application processor 706 may receive one or more expense messages from the application 112 indicative that a user has selected a particular expense object for inclusion in an expense report. The expense message may identify the specific expense report by including an identifier of the expense report and/or the expense object. Additionally, the expense message may also include an identifier of the company to which the expense report is to be submitted and/or a type of expense report that is to be submitted (e.g., an XML form, a text list, grouped expense objects, etc. The object generator 710 receives at least some of the information included in the expense message(s) from the application processor 706 and subsequently creates and/or updates an activity or method in the respective expense object to specify that the expense object is to be submitted to the specified company and/or included within the specified expense report. At this point, the example object generator 710 may store each of the expense objects that are selected for an expense report to the memory 114. It should be appreciated that expense objects that are not selected are selectively excluded from being stored to the memory 114.

The example expense report generator 712 uses the activities in the expense object during the creation of an expense report.

V. Secure Transaction Engine—Expense Report Generator

As mentioned above, the example secure transaction engine 302 includes the expense report generator 712 to create expense reports. The example expense report generator 712 may create a blank expense report, a shell, a file, or data structure for an expense report responsive to a user selecting the "New Item" in the management section 904 of the user interface 900 of FIG. 9. The expense report generator 712 assigns an identifier to the expense report. Further, the expense report generator 712 prompts the user (through the application processor 706 and the application 112) for a third-party that is to receive the expense report. The expense report generator 712 may also prompt the user for a type of expense report and/or a deadline for submitting the expense report. The expense report generator 712 stores the expense report to the memory 114.

The example expense report generator 712 may receive one or more messages from the expense object generator 710 regarding the storage of expense objects to the memory. Additionally or alternatively, the expense report generator 712 may periodically check the memory 114 for the addition of expense reports and/or updates to saved expense reports. To populate an expense report with transactions (e.g., expense objects), the example expense report generator 712 determines which of the expense objects include a parameter or field that includes an activity that identifies the expense report. The expense report generator 712 then stores the identified expense object to the expense report. Storing can include, for example, storing XML expense objects to an XML file and/or reading information from the expense object and storing the information to a form or file (e.g., an XML form). Creating a form or file may include populating fields or parameters that match fields or parameters in the expense object. The expense report generator 712 may also group the expense objects as being part of an expense report in instances where the expense objects themselves are transmitted as a group to a third-party server 106.

The example expense report generator 712 may create and update the expense report in real-time as a user assigns transactions to an expense report. For example, a user may select certain transactions displayed within the user interface 900 of FIG. 9 and select the "Add" button to associate the transactions with the "Denver Trip" expense report. This action causes the application 112 to send one or more messages to the expense object generator 710 and/or the expense report generator 712 via the application processor 706 to assign the expense objects associated with the selected transactions to the "Denver Trip" expense report. The expense report generator 712 then adds the expense objects to the expense report. In other embodiments, the expense report generator 712 may not add the expense objects to the report until a user as selected a finalize option, an option to view an expense report, ends a session, or selects the expense report for submission.

It should be appreciated that the expense report generator 712 selectively excludes expense objects that have not been selected for an expense report. This exclusion prevents a third-party from viewing all of the transactions of a user. Instead, the expense report generator 712 makes only user-submitted transactions viewable to a third-party. Additionally, because excluded expense objects are not stored in the memory 114 (and deleted from local cache or similar memory in the expense management server 102 after an expense report is created/submitted), a third-party cannot access, using any type of request to access, the expense management server 102 to view all of the transactions, thereby providing a level of privacy protection to expense submitters.

Figure 10:
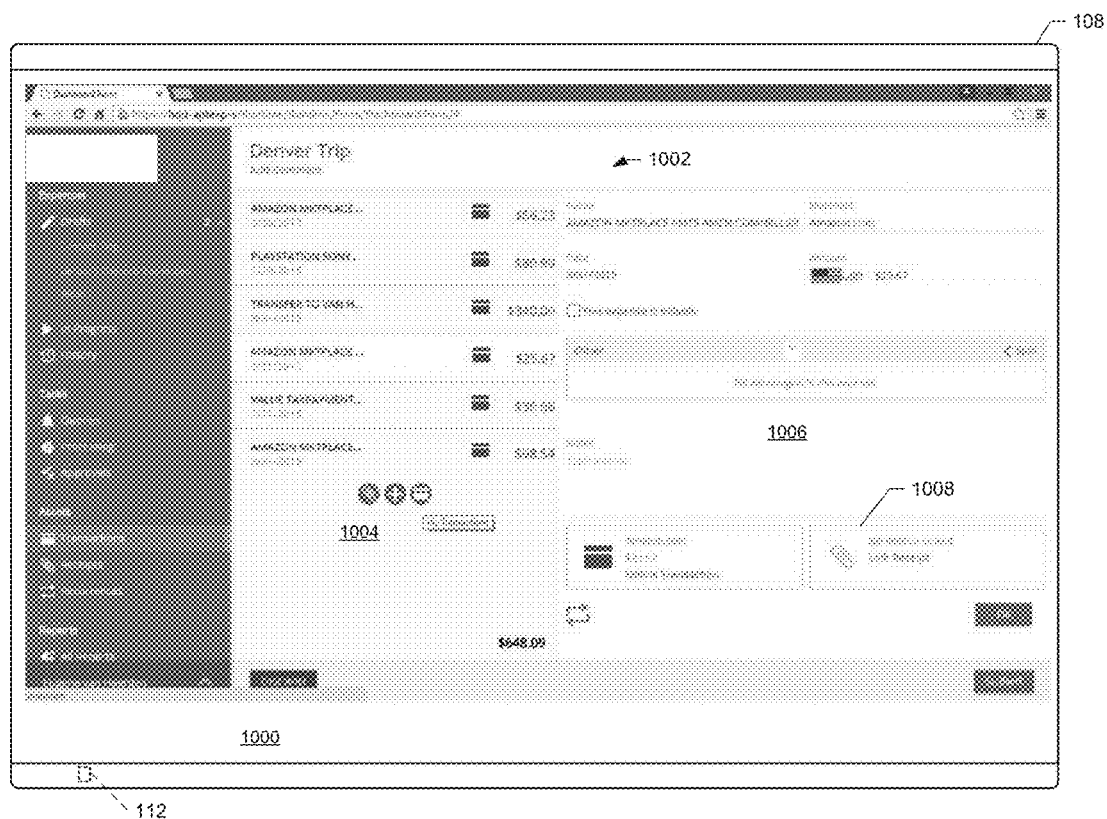
FIG. 10 shows a diagram of a user interface that includes an expense report created by the expense management server of FIGS. 1 to 3 and 7, according to an example embodiment of the present disclosure.

FIG. 10 shows a diagram of a user interface 1000 that includes an expense report 1002 created by the expense management server 102 of FIGS. 1 to 3 and 7, according to an example embodiment of the present disclosure. The example application 112 displays the expense report 1002 as information included within the expense report including information included within expense objects associated with an expense report. The application 112 displays the expense report 1002 similar to how the expense report may be viewable by a third-party.

The example expense report 1002 includes a summary section 1004 that provides a list of the transactions (e.g., expense objects) included within the report. The summary section also includes a monetary total of the values of the expense objects. Selection of any of the transactions causes the user interface 1000 to display in expense section 1006, via the application 112, data including the defined data subsets that is stored to the expense object. In the illustrated example, the data includes a merchant name, a transaction description, a post date, an amount. In other examples, the account identifier and a transaction identifier may also be displayed. This defined data subset displayed in expense section 1006 is enough to prove to a third-party that the expense is valid.

In some instances, the expense section 1006 may provide data specific to the requirements of a third-party that is to receive the expense report. For example, a third-party may also require that a merchant address be included. Such information may be stored in the memory to a third-party requirement file (which may also include an indication of the expense report type). The example expense object generator 710 and/or the expense report generator 712 may read this file before creating an expense objects and/or creating the expense report to ensure that all the required information is stored. Further, the example application processor 706 and/or the aggregation interface 702 may access this file to determine what data is to be included within a defined data subset.

The example expense section 1006 also includes a receipt object 1008 that is configured, through the user interface 1000 operated by the application 112 to enable a user to add an image or a receipt to the transaction. Selection of the receipt object 1008 may cause the application 112 to activate a camera on the user device 108, thereby enabling a user to record a picture of the receipt. Additionally or alternatively, selection of the receipt object 1008 may cause the application 112 to open a file browser window that enables a user to select a file storing an electronic receipt. Selection of a receipt causes the application 112 to transmit one or more messages to the expense object generator 710 to create an activity or method that includes a link to a location in the memory 114 that stores the receipt. The example expense report generator 712 may use the link to append the receipt files to an expense report at the time of submission.

The example expense report generator 712 is also configured to transmit expense reports to the third-party servers 106. The example report generator 712 transmits an expense report responsive to receiving a submit message from the application 112 that is indicative of a user a selecting the "Submit" button on the user interface 1000. To transmit the expense report, the expense report generator 712 determines a destination address (e.g., an Internet Protocol address, e-mail address, API address) of the intended third-party or expense system 202. In some instances, the expense report generator 712 may access a requirement file for the address and/or transmission method. Alternatively, the address and/or transmission method may be stored under an appropriate property or parameter in the expense report or within an activity or method parameter of an expense object.

The expense report generator 712 may compile the expense report (and any receipt files) and transmit one or more messages that include the expense report (including an identifier or the user and/or identifier of the expense report). The transmission may include transmitting one or more files including expense objects, information included within expense objects, and/or an image of information in the expense objects. The expense report generator 712 may also transmit the expense objects (and/or user/expense report identifiers) in one or more messages to a well-defined API at the third-party server that is configured to directly receive and process expense objects. Such a submission procedure may be used when expense objects are provided directly into a workflow (e.g., the workflow 322) of a third-party.

VI. Secure Transaction Engine—Adaptive Processor

The example secure transaction engine 302 includes the adaptive processor 708 to create and/or update one or more rules, algorithms, instructions based on actions or preferences of a user. The adaptive processor 708 is periodically reads the memory 114 to determine which transactions have been selected by a user to be added to expense reports. The adaptive processor 708 counts the transactions with similar priorities and compares the count to a threshold. Responsive to the count exceeding the threshold, the adaptive processor 708 creates a rules based on the matching property. As discussed above in conjunction with FIG. 8, the threshold may be specified by a user. Alternatively, the threshold may be set as a default and/or updated based on feedback from a user.

In an example, the adaptive processor 708 may read the expense objects in the memory and determine that there are four expense objects that include 'Merchant A' within a merchant field or parameter. The adaptive processor 708 determines if a count of four exceeds the predetermined threshold, and if so, creates a rule that specifies transactions that include 'Merchant A' should be flagged for an expense report. The adaptive processor 708 may also determine that the four transactions with the same 'Merchant A' are all transmitted to 'Company XYZ' for reimbursement. The adaptive processor 708 may enhance the rule or create a second rule that transaction with 'Merchant A' should be flagged for submission to 'Company XYZ'.

The example adaptive processor 708 may also read all expense objects displayed to a user during a session (through communication with the application processor 706 and/or the expense object generator 710) and determine common properties among transactions that are not selected for submission. Responsive to determining that a number of transactions that have the same property are not selected, during the session or over the course of multiple sessions, the adaptive processor 708 creates a rule that specifies future similar expense objects are to be graphically dimmed or hidden from view. Such a configuration enables the expense management server 102 to assist a user to determine which transactions are to be submitted.

VII. Application Interface

The example expense management server 102 of FIG. 7 includes an application interface 714 configured to communicate with the application 112 at the user devices 108. The example interface 714 is configured to receive expense objects from the expense object generator 710 and/or the application processor 706 for display within, for example, the user interface 900 of FIG. 9. Responsive to receiving the expense objects, the application interface 714 creates one or more messages to transmit the expense objects across the network 110 to the user devices. The application 112 in conjunction with the user interface 900 uses action and/or method parameters or fields in the expense objects to determine how the expense objects are to be displayed and/or whether expense objects are to include flags or highlighting.

The example application interface 714 also receives messages from the application 112 indicative of a user's interaction with the expense objects and/or the user interface 900. The application interface 714 is configured to read and parse the messages for the data or interaction information, which is then transmitted to the application processor 706, expense object generator 710, and/or the expense report generator 712. The messages may, for example, be indicative of a user creating an expense report, selecting an expense object, submitting an expense report, providing registration information, and/or providing third-party information.

In instances where an image of the information within the expense objects is transmitted, the example application interface 714 is configured to transmit the image within one or more messages to the application. The application interface 714 may also define and transmit locations for fields provided in conjunction with the image to record a user's interaction with the image. Responsive to receiving one or more messages from the application 112 indication of a user's interaction with the fields, the application interface 714 parses the instruction or interaction data from the messages and transmits the data to one of the application processor 706, the expense object generator 710, the expense report generator 712, and/or the adaptive processor 708.

VIII. Third-Party Interface

The example expense management server 102 includes a third-party interface 716 to transmit expense reports and/or expense objects to the third-party servers 106. The example third-party interface 716 is configured to transmit the expense report and/or expense objects based on a transmission method and/or destination address stored in the expense report and/or expense objects. Additionally or alternatively, the third-party interface 716 may access a registration file for the destination address and/or transmission method. In an example, the third-party interface 716 may manage the creation and transmit an expense report (and any related expense objects and/or receipts) within one or more messages. The transmission may occur through, for example, email, a file transfer system, a web session, etc. The example third-party interface 716 may also remove unnecessary information from expense objects, such as method or activity parameters, which may not be used or needed by the third-party.

In some embodiments, the third-party server 106 may include a well-defined API for receiving expense objects and/or an expense report. In these embodiments, the third-party interface 716 converts the data within the expense objects and/or expense report into a format compatible with the API. Such conversion may include relabeling values, fields, properties, activities, and/or parameters.

The example third-party interface 716 is also configured to, when available, obtain feedback or a status of a submitted expense report from the third-party server 106. In some instances, the third-party server 106 may automatically transmit status update messages to the expense management server 102 periodically (e.g., hourly, daily, weekly, etc.) or anytime there is a change to the status. In other instances, the third-party interface 716 may periodically transmit a status inquiry message to the third-party server 106 including, for example, an identifier of a submitted expense report. Responsive to receiving a response message including a status change, the example third-party interface 716 transmits the status change information to the expense object generator 710 to create and/or update an activity parameter to reflect the current status. The expense report generator 712 may also receive the status change information and accordingly store the status to the expense report. Accordingly, the status is displayed to the user when subsequently viewing the expense object and/or the expense report.

In some examples, the status information may include a query from the third-party server 106. For example, an administrator may have a question regarding an expense object. Responsive to receiving information directed to a user, the example third-party interface 716 is configured to cause the expense object generator 710 create and/or update an activity parameter of the respective expense object with the query information. The expense report generator 712 may also update and/or add the query information to the expense report. Further, in some embodiments, the application processor 706 may transmit an alert to a user including the query information.

Automated Processing Embodiments

In some embodiments, the example expense management server 102 is configured to automatically access the financial servers 104 without a user opening the application 112 and/or starting a session. In these embodiments, a user may create one or more rules and/or algorithms that specify what the expense management server 102 is to do automatically. In these embodiments, the server 102 may transmit a prompt for a user to provide username(s) and/or password(s) to access the financial servers 104.

The example adaptive processor 708 may enable a user to create a rule to set alerts, where the secure transaction processor 302 is configured to send a text message, email, voicemail, etc. to a user responsive to determining that a post date of one or more transactions is approaching or has meet a defined threshold. Creation of the rule causes the expense management server 102 to periodically (e.g., daily, weekly, biweekly, monthly, etc.) obtain defined data subsets associated with a user and determine whether the post data (or other value in a field or parameter) satisfies a specified condition. In some embodiments, the expense management server 102 may create expense objects before the analysis is performed. Conditioned on a condition being satisfied, the expense management server 102 transmits an alert to a user. However, since no transactions are stored to an expense report, the server 102 discards the defined data subsets and/or expense objects after the alert is send. In some instances, the expense management server 102 may temporally store the defined data subsets and/or expense objects for a day in the event the alert causes the user to open the application 112 and/or start a session, thereby reducing the amount of processing performed.

In some embodiments, a rule or algorithm may specify an automated process for creating and submitted expense reports. The example secure transaction engine 302 may periodically read the rules from the memory 114 to determine when, for example, transactions are to be obtained from the financial servers 104. The secure transaction engine 302 operates in the same manner as though the user were operating the application 112 during the session. However, instead of the user selecting the expense objects (transactions), the example adaptive processor 708 and/or the application processor 706 is configured to apply the one or more rules for selection of the expense objects. The secure transaction engine 302 may be configured to transmit the expense report to a user to approve the submission (as specified by the user) and/or automatically submit the expense report to the appropriate third-party server 106 and/or the expense system 202.

Flowchart of the Example Process

Figure 11:
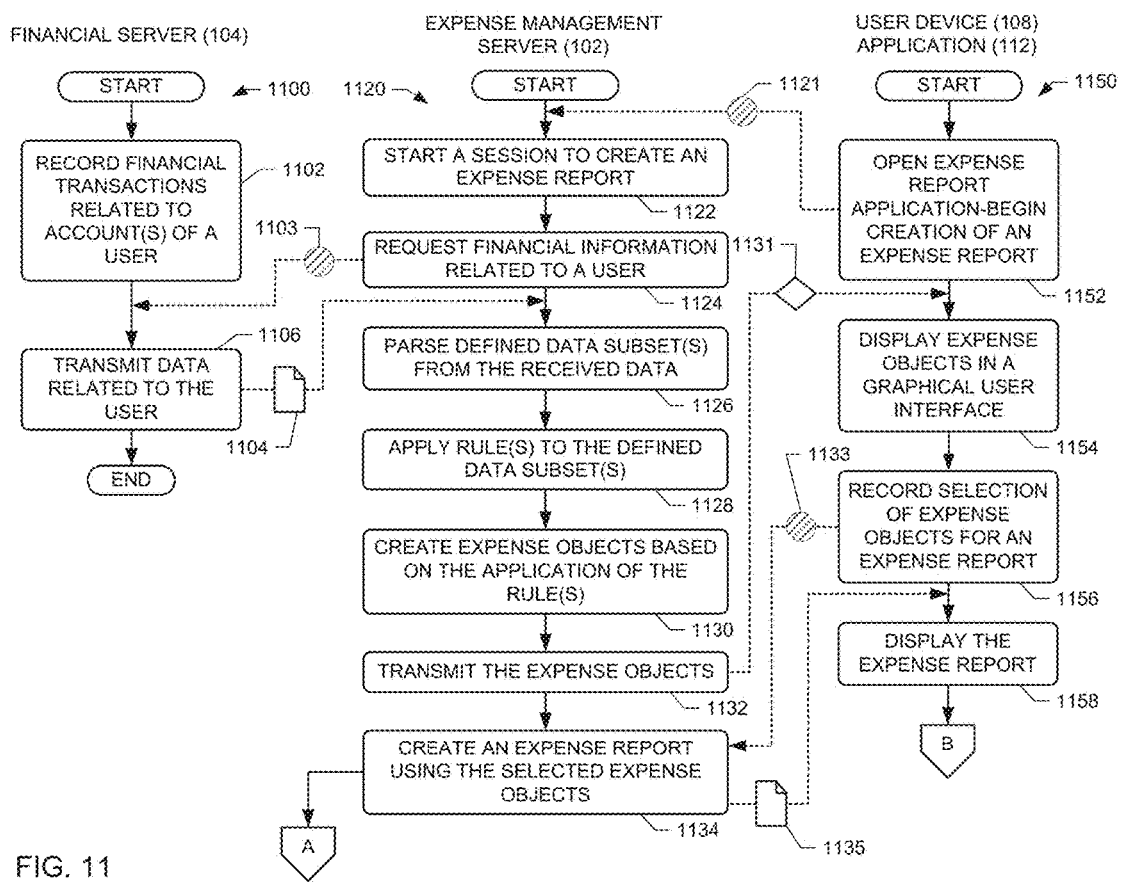
FIGS. 11 and 12 show flow diagrams illustrating example procedures to create an expense report while selectively excluding transactions from a third-party that provides reimbursement, according to an example embodiment of the present disclosure.
Figure 12:
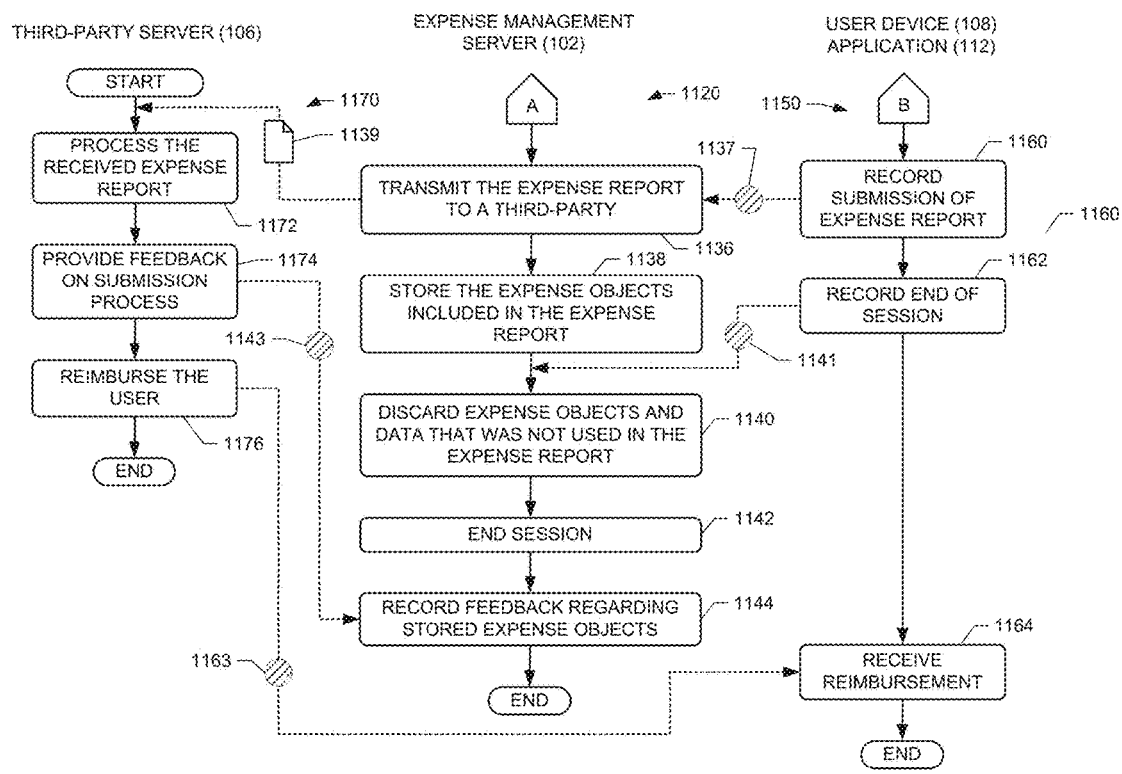

FIGS. 11 and 12 illustrate flow diagrams showing example procedures 1100, 1120, 1150, and 1170 to create an expense report from selected expense objects of transactions, according to an example embodiment of the present disclosure. Although the procedures 1100, 1120, 1150, and 1170 are described with reference to the flow diagrams illustrated in FIGS. 11 and 12, it should be appreciated that many other methods of performing the steps associated with the procedures 1100, 1120, 1150, and 1170 may be used. For example, the order of many of the blocks may be changed, certain blocks may be combined with other blocks, and many of the blocks described are optional. Further, the actions described in procedures 1100, 1120, 1150, and 1170 may be performed among multiple devices including, for example the expense management server 102, one or more financial servers 104, one or more user devices 108, and/or one or more third-party servers 106.

The example procedure 1100 of FIG. 11 begins when the financial server 104 records financial transactions of a user (block 1102). The transactions are recorded as the user incurs or charges expenses to an account managed, operated, and/or held by the financial server 104. In the instances of a financial aggregator, the transactions are received from financial entities. Sometime after the recording of the transactions, the financial server 104 receives a message 1103 from the expense management server 102 including an identifier of the user that started a session to create, edit, and/or complete an expense report. The message 1103 may also include one or more credentials related to account(s) of the user or related to a financial entity. The message 1103 may specify which defined data subsets of the transaction data and/or account data is being requested. Alternatively, the message 1103 may specify that all data associated with a user is to be provided. The financial server 104 determines all the accounts and/or transactions related to the user. The financial server 104 may also filter the account and/or transaction data such that only the defined data subset is to be transmitted. In other instances, the financial entity 104 may include an API that limits the data that can be accessed to the defined data subsets. The financial server 104 then transmits the requested data to the expense management server 102 in one or more messages 1104 (block 1106). The example procedure 1100 then ends with respect to the financial server 104.

The example procedure 1120 of FIG. 11 begins when the expenses management server 102 receives a message 1121 from an application 112 operating on a user device 108 indicative that a user would like to create and/or edit an expense report. The message 1121 may also specify that the user has initiated the application 112 at the user device 108. In response to receiving the message 1121, the example expense management server 102 starts a session to create and/or edit an expense report (block 1122). The expense management server 102 also transmits one or more messages 1103 to financial servers 104 requesting financial information related to the user (block 1124). The request may include parameters, fields, or properties related to a defined account data subset and/or a defined transaction data subset. Alternatively, the request may be for all data related to the user. As specified above, the message 1103 includes an identifier of the user and one or more credentials to access the accounts.

The example expense management server 102 receives the requested data in one or more messages 1104 from the financial server(s) 104. After receiving the data, the example expense management server 102 parses the data for the defined data subsets (block 1126). In instances where only defined data subsets are received, the parsing may be limited to removing transactions related to account credits. In other instances where substantially all account, transaction, and/or institution is received, the example expense management server 102 reads the data labels to determine which data is to be passed through the exclusion wall 324 or otherwise selected for further processing into expense objects. For example, the expense management server 102 searches for data labels related to a transaction amount, a post data, a merchant name, a description, a transaction identifier, and/or an account identifier. In some instances, the expense management server 102 may include a well-defined API that is configured to only allow data related to defined data subsets to pass for further processing.

The example expense management server 102 also applies one or more rules of the defined data subsets (block 1128) and creates expense objects based on the rules (block 1130). Some rules may specify whether an expense object to be created based on the contents of the defined data subsets. Other rules may specify whether certain expense objects are to be graphically flagged, highlighted, etc. when displayed. Still other rules may specify that certain expense objects are to hidden from view but searchable. The expense management server 102 then transmits the expense objects in one or more messages 1131 to the application 112 at the user device 108 for display (block 1132).

During the session, the expense management server 102 receives one or more messages 1133 indicative that the user has selected at least one or more of the expense objects for inclusion in an expense report. The messages 1133 may include an identifier of the expense objects, which may include an identifier of the respective transaction. Responsive to receiving the messages 1133, the expense management server 102 creates an expense report using the selected expense objects (block 1134). Creating the expense report may include determining a third-party that is to receive the expense report, accessing a registration file for the third-party, creating an expense report in a format or type specified by the file, and storing a destination address (transmission type) to the expense report as provided in the file. In instances where an expense report is already created, the expense management server 102 adds the newly selected expense objects to the expense report. As described above, adding the expense objects to the expense report may include updating or creating an activity parameter of the expense objects to include an identifier of an expense report. The activity parameter may also include a reference or link to the expense report. Alternatively, information from the expense objects may be stored to a file that embodies the expense report.

At block 1134, the expense management server 102 may also transmit one or more messages 1135 that include the expense report to the application 112 at the user device 108. The expense management server 102 may then receive a message 1137 indicative that a user has selected to submit the expense report. After receiving the message 1137, the expense management server 102 transmits the expense report (and any attached receipts) to a third-party server 106 (block 1136). The transmission occurs within one or more messages 1139 within a format specified by the third-party (e.g., email, file transfer, web session, API, etc.).

The expense management server 102 further stores the expense objects used for the expense report in the memory 114 (block 1138). In some embodiments, the storage of the expense objects may occur after the selection message 1133 is received. Then, after receiving a message 1141 indicative that a user has ended the session or closed the application 112, the example expense management server 102 discards the expense objects and other data that was not already stored to the memory (block 1140). The expense management server 102 also ends the session (block 1142). It should be appreciated that the expense management server 102 selectively excludes these discarded expense objects from being included in an expense report or otherwise being provided to a third-party. Discarding of the unselected expense objects provides an additional level of assurance that a third-party will not have access to unselected expense objects. Only the expense objects of the transactions selected by the user are provided to the third-party, thereby giving the user control over which transactions are made available to an employer or other entity. It should be appreciated that discarding the expense objects includes deleting the expense objects themselves in addition to deleting any trace of the expense objects in cache or other temporary memory. This may include permanently deleting expense objects and related data to prevent reconstruction any underlying transaction data, account data, and/or defined data subsets.

After the expense report is submitted to a third-party server 106, the expense management server 102 may receive one or more status messages 1143 that include information regarding an approval and/or payment of the expense report and/or individual expense objects. The messages 1143 may also indicate whether an expense object or expense report was denied and/or may include requests for more information. Responsive to receiving the messages 1143, the expense management server 102 determines which expense objects are associated with the messages 1143 and accordingly updates and/or creates an activity parameter to reflect the status change (block 1144). The expense management server 102 may also update the status of the expense report. After an expense report has been completed paid, the example procedure 1120 ends with respect to that expense report.

The example procedure 1150 of FIG. 11 begins when a user opens the application 112 or starts the creation or editing of an expense report on the user device (block 1152). After opening or receiving the indication to create/modify an expense report, the application 112 transmits a session initiation message 1121 to the expense management server 102. The message 1121 may also identify the user that opened the session and/or a third-party to receive the expense report (as specified by the user). The application 112 then receives one or more messages 1131 that include expense objects related to accounts of the user. In response to receiving the messages 1131, the application 112 displays the expense objects in a graphical user interface on the user device 108 (block 1154). The application 112 then records which of the expense objects have been selected to be included within the expense report (block 1156). The application 112 may transmit one or more selection messages 1133 to the expense management server 102 that identify the selected expense objects.

After receiving one or more messages 1135 from the expense management server 102, the application 112 may display the expense report (block 1158). In some instances, the application 112 will only display the expense report upon receiving an indication from the user to view the expense report. The expense report may be displayed in a format that is similar to how the intended third-party will view the expense report. Alternatively, the expense report may be displayed in a format that is more easily viewable by the user, such as when, for example, the expense report to be transmitted to the third-party is in a machine-readable format.

The application 112 may also record an indication that the user desires to submit the expense report (block 1160). In some instances, the application 112 may only enable a user to submit an expense report only after viewing a complete version of the expense report to be submitted. After recording the submission request, the application transmits one or more submission messages 1137 to the expense management server 102. The application 112 may also record a user's selection to end the session or close the application 112 (block 1162). In response, the application 112 transmits an end-of-session message 1141 to the expense management server 102. Between submission and final reimbursement, the application 112 may receive one or more alerts or updates from the expense management server 102 indicative of a status change to the expense report and/or a request for more information. Sometime later the application 112 may receive one or more messages 1163 from the third-party server 106 indicative that the expense report has been reimbursed (block 1164). At this point, the example procedure 1150 ends with respect to the expense report.

The example procedure 1170 begins then a third-party server 106 receives one or more messages 1137 that include an expense report (and attached receipts if appropriate). The third-party server 106 processes the received expense report (block 1172). Processing may include sending the expense report to one or more individuals for approval. Processing may also include converting the expense report into a format compatible with internal records for the third-party. During the processing, the third-party server 106 transmits one or more messages 1143 that include a status change to the expense report and/or a request for more information (block 1174). After the expense report is approved, the third-party server 106 reimburses the user and may send one or more messages 1163 indicative of the reimbursement (block 1176). At this point, the example procedure 1170 ends with respect to the expense report.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An expense report management apparatus comprising:
   an aggregation interface configured to:
      receive, from a financial entity, a defined account data subset of account data related to a financial transaction of a user, the defined account data subset including an account identifier of an account that includes the financial transaction, and
      receive, from the financial entity, a defined transaction data subset of transaction data of the financial transaction, the defined transaction data subset including a transaction identifier, a description of the financial transaction, a merchant name, an amount, and a post date; and
   a secure transaction engine communicatively coupled to the aggregation interface and configured to:
      create an expense object that includes the defined account data subset and the defined transaction data subset,
      display information from the expense object within a first graphical user interface in conjunction with information from other expense objects related to the user, each of the other expense objects including a respective defined account data subset and a respective defined transaction data subset,
      receive an expense message from the user indicating that the expense object is to be submitted to a third-party designated to perform expense reimbursement,
      responsive to receiving the expense message,
         (i) store the expense object to a file within a memory,
         (ii) create an expense report that includes the expense object and selectively exclude the other expense objects to shield the other expense objects from being accessible or viewed by the third-party, and
         (iii) discard the other expense objects,
      display information from the expense report within a second graphical user interface including information from the expense object that is indicative of information the third-party will view to perform expense reimbursement, and
      responsive to receiving a submit message from the user, transmit the expense report to a server of the third-party for expense reimbursement.

2. The expense report management apparatus of claim 1, wherein the secure transaction engine is configured to discard the other expense objects responsive to receiving an indication that at least one of:

(a) the first graphical user interface has been closed,
(b) a session associated with the first graphical user interface has ended,
(c) the expense report has been transmitted to the third-party, and
(d) the expense report has been finalized.

3. The expense report management apparatus of claim 1, wherein the secure transaction engine is configured to, responsive to receiving the expense report message, add the expense object to an already created expense report.

4. The expense report management apparatus of claim 1, wherein the secure transaction engine is configured to remove the defined account data subset before the expense object is included within the expense report.

5. The expense report management apparatus of claim 1, wherein the aggregation interface in combination with the secure transaction engine is configured to prevent user specified financial transactions from being submitted to the third-party.

6. The expense report management apparatus of claim 1,
wherein the account data further includes at least one of
i) a transaction identifier of the financial entity, ii) a user nickname of the user account, iii) an account type, iv) a name of the financial entity, v) a creation date of the financial transaction information, and vi) an account number, and
wherein the aggregation interface includes an exclusion wall configured to prevent the at least one of i) to vi) from being received from the financial entity.

7. The expense report management apparatus of claim 1,
wherein the transaction data further includes at least one of i) a category name, ii) a status of the financial transaction, iii) a type of the financial transaction, iv) a name of the user account at the financial entity, v) a search identifier, vi) a number of search hits, and vii) a category identifier, and
wherein the aggregation interface includes an exclusion wall configured to prevent the at least one of i) to vii) from being received from the financial entity.

8. The expense report management apparatus of claim 1, wherein the financial transaction includes institution data of the financial entity and the aggregation interface is configured to prevent the institution data from being received from the financial entity.

9. The expense report management apparatus of claim 1, wherein the secure transaction engine is configured to:
receive a display message from the user indicative that all financial transactions associated with the account identifier are to be displayed; and
responsive to receiving the display message, determine that the expense object is to be displayed within the first graphical user interface.

10. The expense report management apparatus of claim 1, wherein the secure transaction engine is configured to:
determine an identifier of the expense report;
determine a status of the expense report;
store the identifier and the status to the expense object; and
display the identifier and the status adjacent to the information from the expense object within the first graphical user interface.

11. The expense report management apparatus of claim 1, wherein the financial entity is a financial aggregation entity.

12. An expense management method comprising:
receiving, in a secure transaction server from a financial entity, a defined account data subset of account data related to a financial transaction of a user, the defined account data subset including an account identifier;
receiving, in the secure transaction server from the financial entity, a defined transaction data subset of transaction data of the financial transaction, the defined transaction data subset including a transaction identifier, a description of the financial transaction, a merchant name, an amount, and a post date;
creating, via the secure transaction server, an expense object that includes the defined account data subset and the defined transaction data subset;
displaying, via the secure transaction server, information from the expense object within a graphical user interface in conjunction with information from other expense objects related to the user, each of the other expense objects including a respective defined account data subset and a respective defined transaction data subset;
receiving, in the secure transaction server, a selection from the user that only the expense object among the plurality of expense objects is to be added to an expense report;
responsive to receiving the selection, creating, via the secure transaction server, the expense report that includes the expense object and excludes the other of the expense objects such that a third-party will not receive the other of the expense objects; and
transmitting from the secure transaction server the expense report for expense reimbursement related to the user.

13. The method of claim 12, further comprising:
receiving, in the secure transaction server, a second selection from the user indicative that all transactions associated with the account identifier are to be displayed;
determining, via the secure transaction server, the expense object associated with the account identifier; and
displaying, via the secure transaction server, information from the expense object among information from other expense objects within the graphical user interface.

14. The method of claim 13, further comprising:
determining, via the secure transaction server, at least two instances where past expense objects include a particular merchant and have been added to at least one expense report;
determining, via the secure transaction server, the defined transaction data subset of the expense object includes the particular merchant;
store to the expense object an indicator that the information from the expense object is to be at least one of flagged or highlighted for addition to the expense report; and
display at least one of the flag and the highlight in conjunction with the information from the expense object within the graphical user interface.

15. The method of claim 13, further comprising:
determining, via the secure transaction server, at least two instances where past expense objects include the account identifier and have been added to at least one expense report;
determining, via the secure transaction server, the defined account data subset of the expense object includes the account identifier;
store to the expense object, via the secure transaction server, an indicator that the information from the expense object is to be at least one of flagged or highlighted for addition to the expense report; and display, via the secure transaction server, at least one of the flag and the highlight in conjunction with the information from the expense object within the graphical user interface.

16. The method of claim 12, further comprising:

determining, via the secure transaction server a date difference between a current date and the post date within the defined transaction data subset of the expense object; and conditioned on the data difference being equal to or greater than a threshold value, storing to the expense object, via the secure transaction server, an indicator that the information from the expense object is to be at least one of flagged or highlighted.

17. The method of claim 16, further comprising receiving, via the secure transaction server, the threshold value from an entity that reimburses based on the expense report, wherein the threshold value is between 30 and 90 days.

18. The method of claim 12, further comprising:

determining, via the secure transaction server, a status of the expense report;

store the status to the expense object; and display the status adjacent to the information from the expense object the within the graphical user interface.

19. The method of claim 18, wherein the secure transaction server is configured to receive the status of the expense report from an entity that reimburses based on the expense report.

20. The method of claim 12, further comprising:

receiving, via the secure transaction server, a payment indication the expense report has been reimbursed;

receiving, via the secure transaction server, a display message from the user to view expense objects;

determining the expense object includes the payment indication; and hiding information from the expense object from display within the graphical user interface.

21. A non-transitory machine-accessible device having instructions stored thereon that are configured when executed to cause a machine to at least:

receive a message from an application indicative that a user has begun a session related to an expense report;

transmit an identifier of the user to a plurality of financial entities that have accounts related to the user;

selectively receive, from the plurality of financial entities, (i) defined account data subsets of account data related to financial transactions of the user, and (ii) defined transaction data subsets of transaction data of the financial transactions;

create an expense object for each for each of defined account data subsets and the corresponding defined transaction data subsets;

cause the application to display information from the expense objects within a graphical user interface;

receive an expense message from the application indicative of a selection of one of the expense objects;

responsive to receiving the expense message,
 (i) update a method parameter of the selected expense object to indicate an association with the expense report, and
 (ii) store the expense object to a file within a memory;

responsive to determining that the session has ended, discard the expense objects that were not selected to be included within the expense report to selectively exclude the discarded expense objects from being accessible by a third-party; and responsive to receiving a submit message from the application, transmit the expense report including the selected expense object to a server of a specified third-party for expense reimbursement.

22. The machine-accessible device of claim 21, further comprising instructions stored thereon that are configured when executed to cause a machine to at:

responsive to receiving an expense report message from the application indicative that the user has selected to create the expense report, prompt the user to identify the third-party that is to receive the expense report;

responsive to receiving a third-party identification message from the application identifying the third-party, determine an expense report type and a destination address for the third-party from a registration file associated with the third-party, the expense report type including at least one of an XML file and a text file;

create the expense report of the specified type; and store the destination address to the expense report.

23. The machine-accessible device of claim 21, further comprising instructions stored thereon that are configured when executed to cause a machine to at:

before creating the expense objects, determine for each financial transaction whether the respective defined transaction data subset includes a debit or a credit value; and responsive to determining the defined transaction data subset includes a credit value, refrain from creating the expense object from the respective defined transaction data subset.

\* \* \* \* \*